(12) United States Patent
Hoshino et al.

(10) Patent No.: US 11,898,966 B2
(45) Date of Patent: Feb. 13, 2024

(54) INFORMATION PROCESSING APPARATUS, INFORMATION PROCESSING METHOD, AND NON-TRANSITORY COMPUTER-READABLE STORAGE MEDIUM

(71) Applicant: CANON KABUSHIKI KAISHA, Tokyo (JP)

(72) Inventors: Shoichi Hoshino, Tokyo (JP); Atsushi Nogami, Kanagawa (JP); Kazuhiko Kobayashi, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 126 days.

(21) Appl. No.: 17/405,607

(22) Filed: Aug. 18, 2021

(65) Prior Publication Data

US 2022/0099588 A1 Mar. 31, 2022

(30) Foreign Application Priority Data

Sep. 29, 2020 (JP) ................................. 2020-163886

(51) Int. Cl.
*G01N 21/88* (2006.01)

(52) U.S. Cl.
CPC ... *G01N 21/8851* (2013.01); *G01N 2021/887* (2013.01); *G01N 2021/888* (2013.01); *G01N 2021/8887* (2013.01)

(58) Field of Classification Search
CPC .. G01N 21/8851; G01N 33/383; G01N 21/84; G01N 29/0609; G01N 2021/8861; G01N 2021/8887; G01N 2203/0069; G01N 9/36; G01N 2021/887; G01N 2021/888; G01N 21/88; G01N 2021/8858;
(Continued)

(56) References Cited

U.S. PATENT DOCUMENTS 9,621,793 B2 4/2017 Furihata et al.
9,858,670 B2 1/2018 Nakazato et al.
(Continued)

FOREIGN PATENT DOCUMENTS

CN 105510344 A * 4/2016 ......... G01N 21/8851
CN 105910902 A * 8/2016 ............. G01B 21/02
(Continued)

*Primary Examiner* — Michael P Stafira
(74) *Attorney, Agent, or Firm* — Carter, DeLuca & Farrell LLP

(57) ABSTRACT

This invention provides a processing apparatus for determining a state of secular change of a deformation of a construction, comprising a selection unit that selects, as a target for determination of secular change, at least a portion of deformations from among a plurality of deformations included in a first image at a first time period, on the basis of at least one of information relating to deformations, information relating to the construction, user selection, or a shape and a relative positional relationship of two or more deformations; a first determination unit that determines a deformation corresponding to a selected deformation among a plurality of deformations included in a second image at a second time period; and a second determination unit that determines a state of secular change between a selected deformation and a deformation determined by the first determination unit.

17 Claims, 17 Drawing Sheets

(58) Field of Classification Search
CPC ....... G01N 2021/8893; G01N 21/8803; G01N 21/95; G01N 33/38
See application file for complete search history.

(56) References Cited

U.S. PATENT DOCUMENTS

| | | |
|---|---|---|
| 9,943,961 B2 | 4/2018 | Nakazato et al. |
| 10,059,002 B2 | 8/2018 | Miyatani et al. |
| 10,497,111 B2 | 12/2019 | Hirota et al. |
| 10,603,791 B2 | 3/2020 | Nakazato et al. |
| 2016/0260027 A1 | 9/2016 | Kuwabara et al. |
| 2021/0281748 A1 | 9/2021 | Nogami et al. |

FOREIGN PATENT DOCUMENTS

| | | | | |
|---|---|---|---|---|
| CN | 106770325 A | * | 5/2017 | ......... G01N 21/8851 |
| CN | 109946296 A | * | 6/2019 | |
| EP | 2693204 A1 | * | 2/2014 | .......... G01M 5/0033 |
| JP | 5852919 B2 | * | 2/2016 | |
| JP | 2017122993 A | * | 7/2017 | |
| JP | 2019-020220 A | | 2/2019 | |
| KR | 101793262 B1 | * | 11/2017 | |
| WO | WO-2018008370 A1 | * | 1/2018 | ............. G01N 21/84 |
| WO | WO-2019150799 A1 | * | 8/2019 | ............. G01B 11/02 |
| WO | WO-2020121917 A1 | * | 6/2020 | ........ G01N 21/8803 |
| WO | WO-2022153852 A1 | * | 7/2022 | |

\* cited by examiner

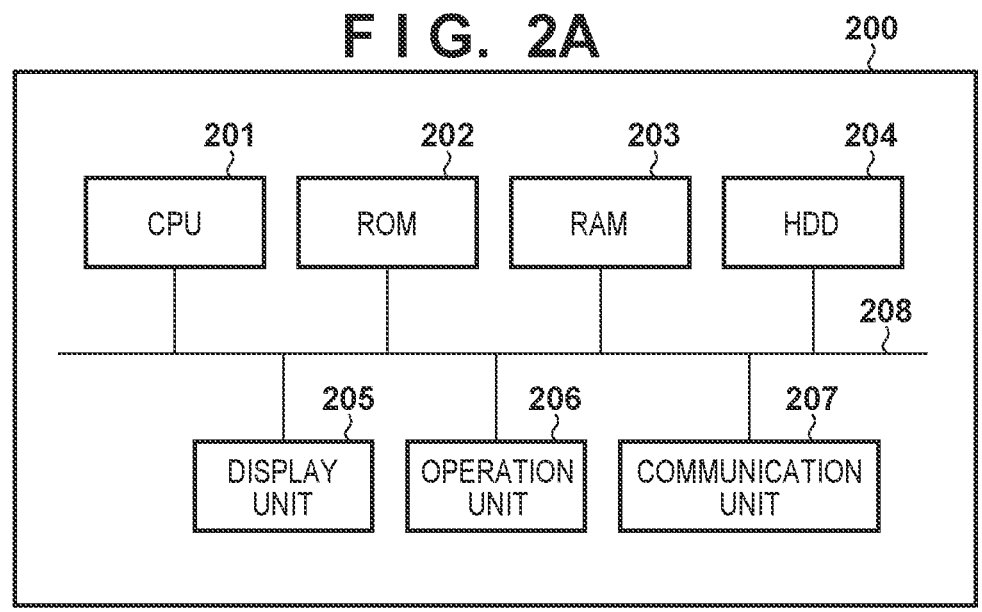
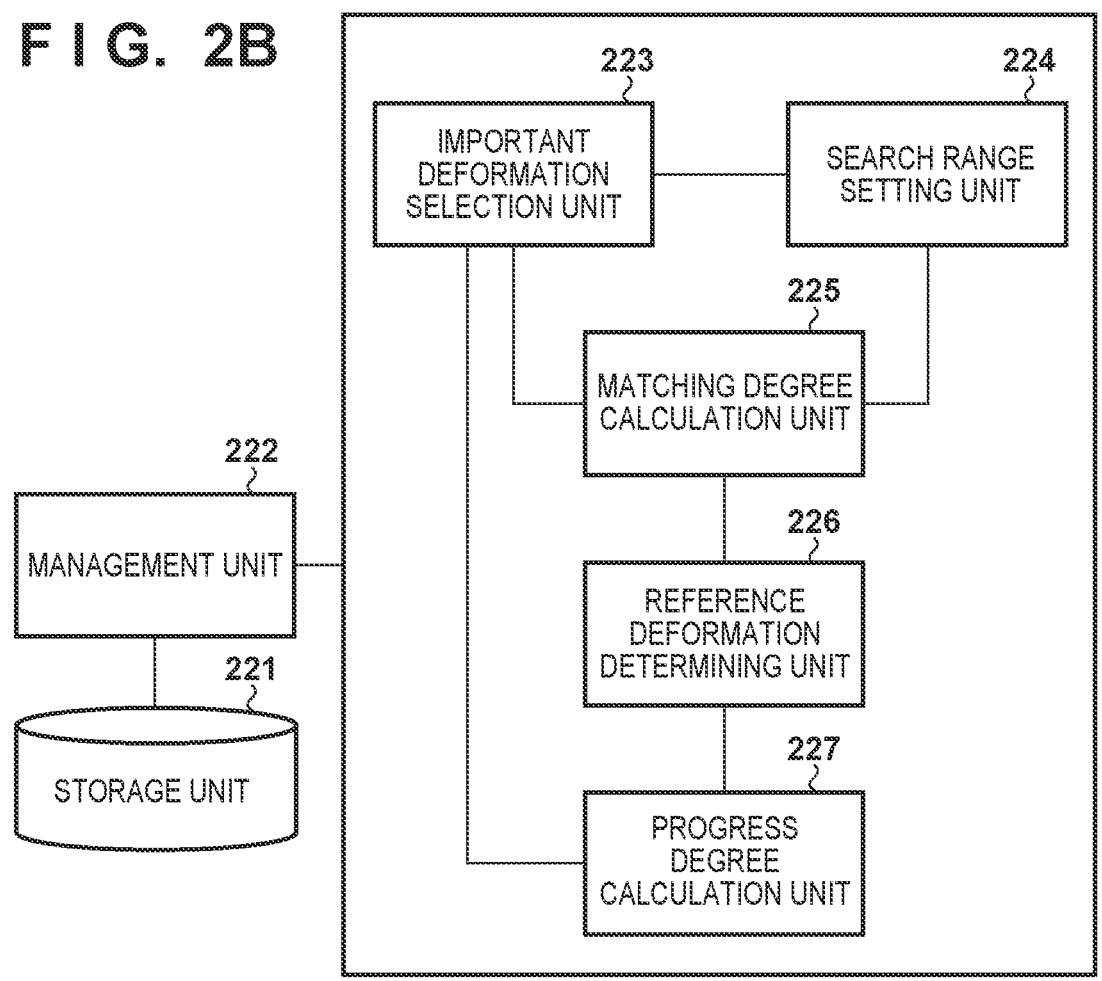

FIG. 3C

| ID | DEFORMATION TYPE | COORDINATES | NUMERICAL VALUE | MAXIMUM WIDTH | TOTAL EXTENSION/ OUTLINE LENGTH | AREA |
|---|---|---|---|---|---|---|
| C001 | CRACK | (Xc001_1,Yc001_1),...,(Xc001_n,Yc001_n) | 0.5mm,...,0.2mm | 0.8mm | 0.5m | 0.01m^2 |
| C002 | CRACK | (Xc002_1,Yc002_1),...,(Xc002_m,Yc002_m) | 0.3mm,...,0.1mm | 0.4mm | 0.4m | 0.01m^2 |
| C003 | CRACK | (Xc003_1,Yc003_1),...,(Xc003_p,Yc003_p) | 1.2mm,...,0.8mm | 1.2mm | 0.9m | 0.03m^2 |
| T001 | REBAR EXPOSURE | (Xt001_1,Yt001_1),...,(Xt001_q,Yt001_q) | 7.0mm,...,2.5mm | 7.3mm | 1.5m | 0.25m^2 |
| ... | ... | ... | ... | ... | ... | ... |
| Cxxx | CRACK | (Xcxxx_1,Ycxxx_1),...,(Xcxxx_r,Ycxxx_r) | 0.1mm,...,0.2mm | 0.6mm | 0.7m | 0.02m^2 |

331

FIG. 5A
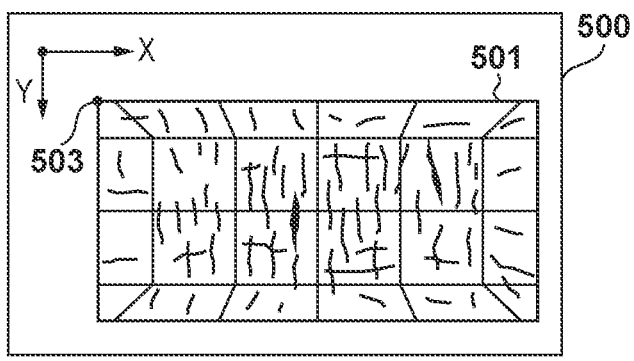
FIG. 5B
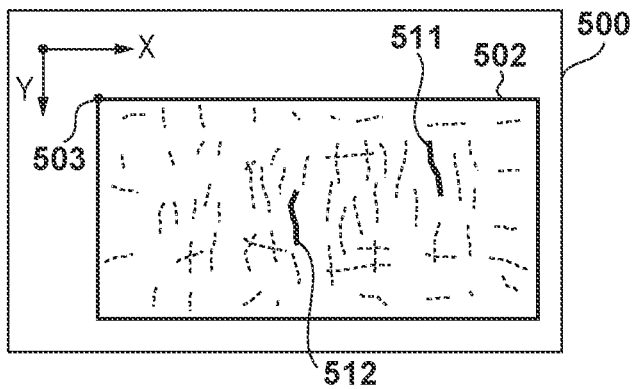
FIG. 5C
| CONSTRUCTION | REFERENCE VALUE |
|---|---|
| SLAB | 1.0mm |
| PIER | 0.5mm |
| BRIDGE | 0.5mm |
| FRAMEWORK | 0.3mm |
FIG. 5D
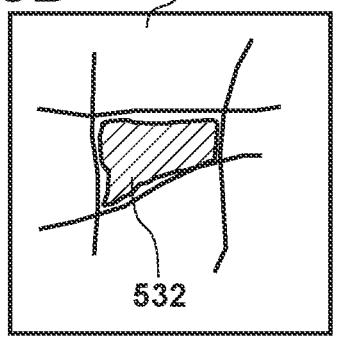
FIG. 5E
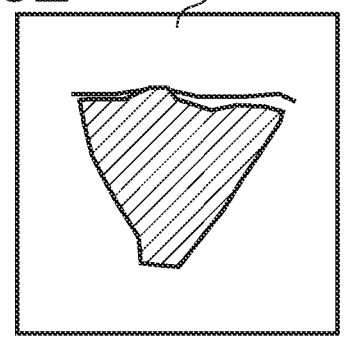

FIG. 8A
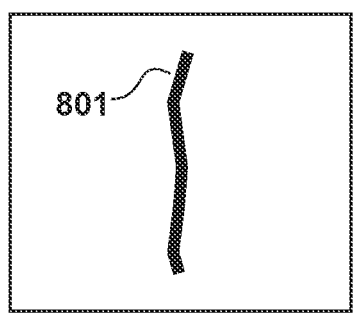
FIG. 8B
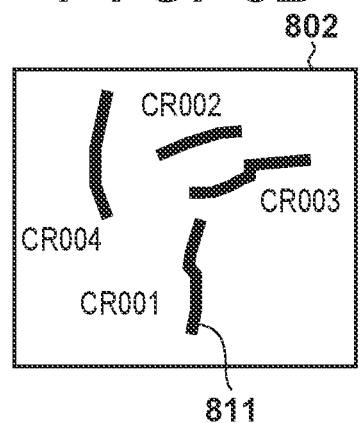
FIG. 8C
| ID | MATCHING DEGREE |
|---|---|
| CR001 | 0.32 |
| CR002 | 0.12 |
| CR003 | 0.1 |
| CR004 | 0 |
FIG. 8D
| ID | MATCHING DEGREE |
|---|---|
| CR111 | 0.55 |
| CR112 | 0.43 |
| CR113 | 0.55 |
| CR114 | 0 |

| ITEM | FIRST GROUP | SECOND GROUP |
|---|---|---|
| NUMBER | 150 | 100 |
| NUMBER DENSITY | $0.75/m^2$ | $0.5/m^2$ |
| TOTAL EXTENSION | 130m | 100m |
| AVERAGE MAXIMUM WIDTH | 0.6mm | 0.5mm |

| ITEM | PROGRESS AMOUNT | PROGRESS RATE |
|---|---|---|
| NUMBER | +50 | +50% |
| NUMBER DENSITY | $+0.25/m^2$ | +50% |
| TOTAL EXTENSION | +30m | +30% |
| AVERAGE MAXIMUM WIDTH | +0.1mm | +20% |

FIG. 15A
| SLAB | 512pixel×512pixel |
| --- | --- |
| PIER | 1,024pixel×1,024pixel |
| BRIDGE | 1,024pixel×1,024pixel |
| FRAMEWORK | 256pixel×256pixel |
FIG. 15B
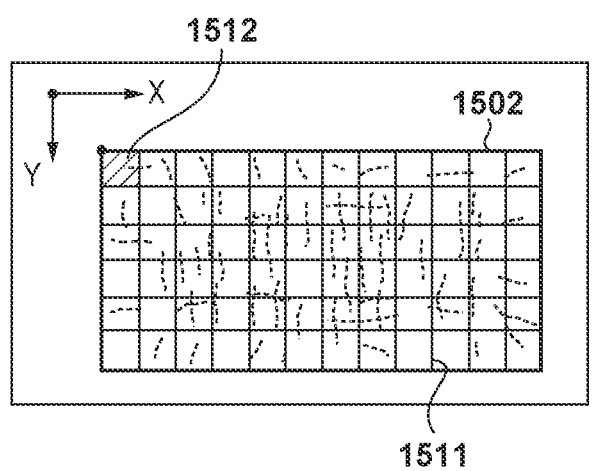
FIG. 15C
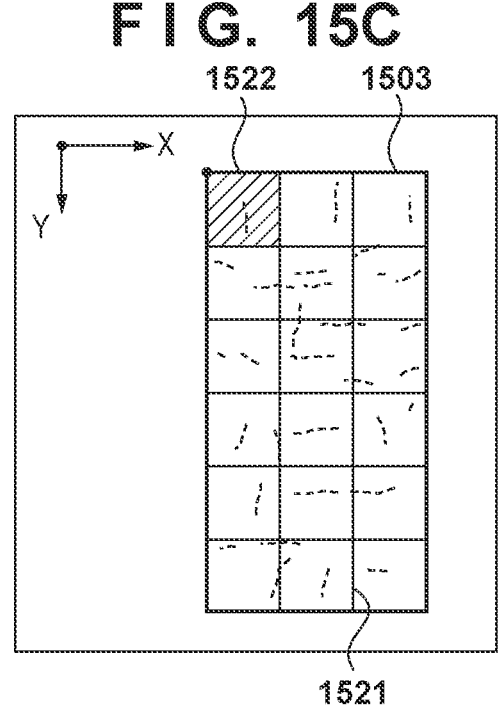
FIG. 15D
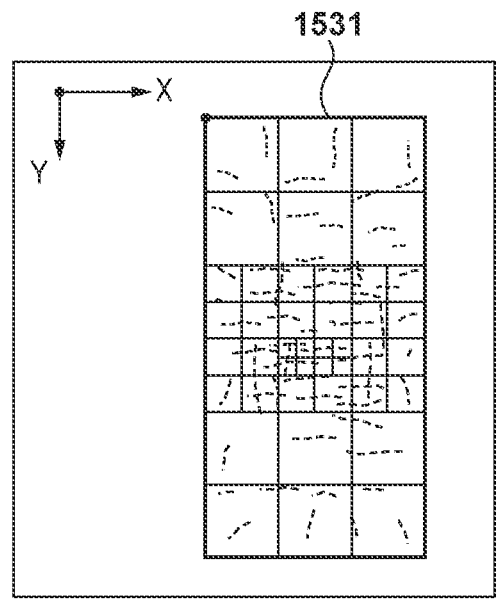

INFORMATION PROCESSING APPARATUS, INFORMATION PROCESSING METHOD, AND NON-TRANSITORY COMPUTER-READABLE STORAGE MEDIUM

BACKGROUND OF THE INVENTION

Field of the Invention

The present invention relates to technology for determining the change in deformation of a construction.

Description of the Related Art

In the inspection of constructions, such as bridges and tunnels, in order to determine soundness, which indicates the soundness of the members of a construction, how much deformation, such as cracks in the construction wall surface, exposure of reinforcement, and the like, has progressed (secular change) needs to be determined. In particular, the degree of progression of deformations with a large effect on the function of the construction, such as large cracks, wide-spread exposure of reinforcement, and the like, is particularly weighted heavily when determining soundness.

In the inspection of an infrastructure construction using images, deformation is detected from images of the wall surface of a construction captured at different time periods and the difference between the detected deformations is obtained to calculate the degree of progress (progress degree) of various deformations. In Japanese Patent Laid-Open No. 2019-20220, technology is described for obtaining the progress degree of cracks in which cracks with a similar feature value across images captured at different times being considered the same crack.

Because the image capture conditions, such as image capture position, weather, and the like, change each time an image is captured, even with captured images of the same wall surface of the same construction, the pixels across images may be misaligned. Thus, to obtain the state of secular change of a deformation, the corresponding relationship between the deformations must be obtained taking into account this misalignment. However, wall surfaces of aged constructions have a large number of deformations. Thus, to obtain the corresponding relationship between all of the deformations detected from the images captured at different time periods while taking into account the misalignment across images, a long time is needed.

SUMMARY OF THE INVENTION

The present invention has been made in light of the problems described above and is directed at providing technology for efficiently obtaining a state of secular change of a deformation.

According to an aspect of the invention, there is provided an information processing apparatus for determining a state of secular change of a deformation of a construction, the information processing apparatus comprising: a selection unit that selects, as a target for determination of a state of secular change, at least a portion of deformations from among a plurality of deformations included in a first image, which is an image of the construction at a first time period, on the basis of at least one of information relating to deformations, information relating to the construction, user selection, or a shape and a relative positional relationship of two or more deformations; a first determination unit that determines a deformation corresponding to a deformation selected by the selection unit from among a plurality of deformations included in a second image, which is an image of the construction at a second time period different from the first time period; and a second determination unit that determines a state of secular change between a deformation selected by the selection unit and a deformation determined by the first determination unit on the basis of information of a deformation selected by the selection unit and information of a deformation determined by the first determination unit.

According to the present invention, even in a case where multiple deformations are present in a construction, the state of secular change of the deformations can be efficiently obtained.

Further features of the present invention will become apparent from the following description of exemplary embodiments with reference to the attached drawings.

BRIEF DESCRIPTION OF THE DRAWINGS

FIG. 2A is a hardware configuration diagram, and FIG. 2B is a functional block diagram.

FIGS. 3A to 3C are diagrams for describing the relationship between deformation data and an image.

FIGS. 5A to 5E are diagrams for describing examples for selecting an important deformation.

FIGS. 8A to 8D are diagrams for describing examples for determining a reference deformation.

FIGS. 15A to 15D are diagrams for describing deformation groups with different sizes.

DESCRIPTION OF THE EMBODIMENTS

Figure 1A:
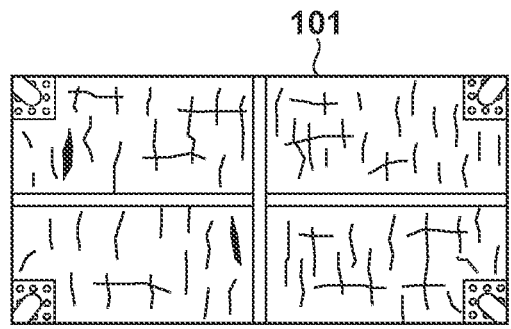
FIGS. 1A to 1E are diagrams for describing an overview of the present invention.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

First Embodiment

As the first embodiment, an example will be described of a method for calculating the progress degree of deformation of an inspection object using two images captured at different time periods. In particular, in the present embodiment, an example will be described of an information processing apparatus for performing an infrastructure inspection, i.e., for determining the soundness of a construction such as a bridge. The terminology used in the description of the present embodiment is defined as follows.

"Inspection object" refers to a concrete construction or the like in a case where an information processing system for performing an infrastructure inspection is being described. A user of the information processing system described in the present embodiment aims to inspect whether there are cracks or other such deformation in a surface on the basis of captured images of the inspection object. "Deformation" refers to concrete cracks, floating, and peeling in the case of a concrete construction, for example. "Deformation" also refers to efflorescence, exposure of reinforcement, rust, water leakage, water dripping, corrosion, damage (defects), cold joints, deposits, honeycombs, and the like.

"First image" and "second image" refer to images of the same wall surface of the same construction captured at different time periods. In the present embodiment, the image capture time period of the first image refers to a time period years after the time period when the second image was captured.

Figure 1B:
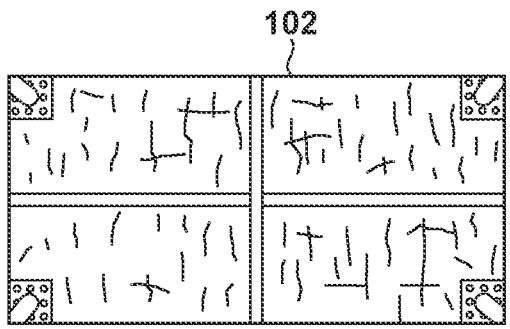
Figure 1C:
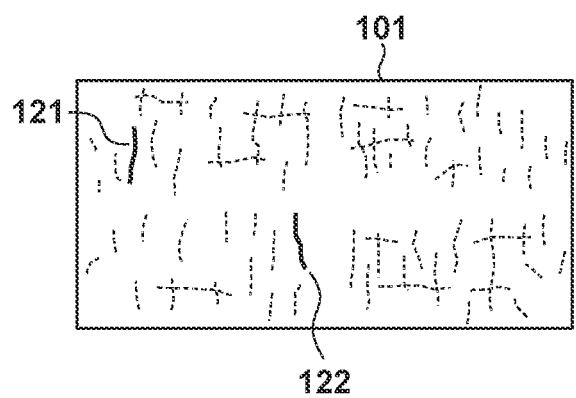
Figure 1D:
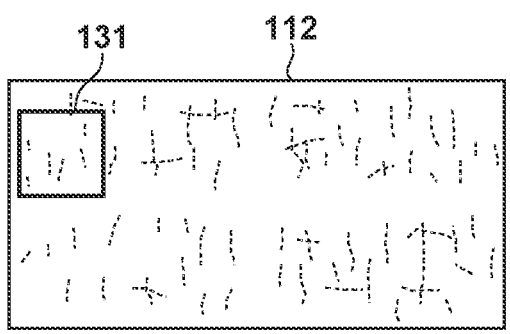

An overview of the present embodiment will be described using an example of calculating the progress degree indicating the state of the secular change of a crack. FIGS. 1A and 1B are diagrams illustrating images 101, 102 of the wall surface of a bridge, i.e., an example of an infrastructure construction, captured at different time periods. The image 101 is an image captured years after the image 102. Due to the secular change, multiple cracks appear in the wall surface of an infrastructure construction. Thus, in the captured images 101, 102, multiple cracks are present. FIG. 1C is a diagram illustrating crack data 111 corresponding to the image 101, and FIG. 1D is a diagram illustrating crack data 112 corresponding to the image 102. The dashed lines and the solid lines in the crack data 111, 112 represent cracks of different widths, specifically fine cracks and wide cracks, respectively. The crack data, for example, is obtained by an inspection technician entering the location, shape, and the like of deformations, such as cracks and exposure of reinforcement, on the basis of an image and associating the entry with the image and recording it. Another example of a method of acquiring crack data includes, for example, using a model trained in advance by machine learning to detect cracks from an image. Note that multiple cracks that do not appear on the surface are also included in the images 101, 102 and the crack data 111, 112.

To determine the soundness of the member, the progress degree of cracks in the member surface is checked. To calculate the progress degree of the cracks, each crack needs to be compared with itself at different time periods and the difference in crack length, crack width, and the like needs to be found. At this time, comparing the cracks of different time periods, there may be misalignment or shape deviation that may cause a difference in the image capture conditions, for example. Furthermore, a difference caused by progress of the crack itself due to secular change may be included. Thus, to calculate the progress degree of the cracks, the corresponding relationship of the cracks must be obtained while taking into account these deviations and differences.

Figure 1E:
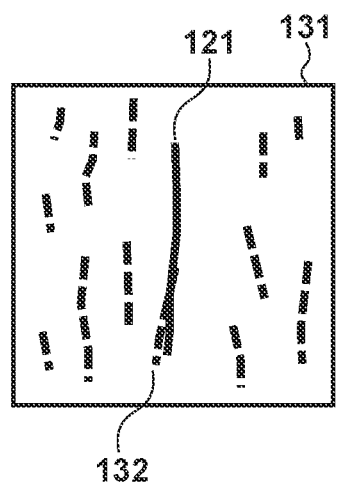

The processing to obtain the corresponding relationship may take a long time in a case where the processing is executed for all of the cracks indicated in the crack data 111. Thus, the corresponding relationship is obtained only for the cracks for which a soundness determination is important. For example, from the crack data 111, wide cracks 121, 122 with a high probability of having an effect on the function of the member are selected. Then, processing is executed to obtain the cracks corresponding to the selected cracks 121, 122 from the crack data 112. An example of a method for obtaining the corresponding relationship of the cracks includes a method of determining the corresponding relationship on the basis of the degree of overlap when the shape of the cracks are overlapped. FIG. 1E is a diagram illustrating an enlarged portion region 131 with the crack 121 superimposed in the crack data 112. From FIG. 1E, it can be seen that the crack with the highest degree of overlap with the crack 121 is a crack 132. Then, the cracks 121, 132 are used to calculate the progress degree of the crack. As the progress degree of the crack, for example, the difference in total length of the crack or the maximum crack width is calculated.

In this manner, even in a case where multiple cracks have appeared in a member surface, the progress degree can be efficiently calculated by selecting only the cracks for which a soundness determination is important.

Information Processing Apparatus

FIG. 2A is a hardware configuration diagram of an information processing apparatus 200 according to the present embodiment. As illustrated in FIG. 2A, the information processing apparatus 200 includes a CPU 201, ROM 202, RAM 203, an HDD 204, a display unit 205, an operation unit 206, and a communication unit 207. The CPU 201 is a central processing unit that executes arithmetic and logical decisions for the processing and controls the components connected to a system bus 208. The read-only memory (ROM) 202 is program memory for storing a program for control by the CPU 201 including the various processing procedures described below, and the random-access memory (RAM) 203 is the main memory of the CPU 201 and is used as a temporary storage area such as a working area. Note that the program memory may be implemented by loading a program on the RAM 203 from an external storage apparatus or the like connected to the information processing apparatus 200.

The HDD 204 is a hard disk for storing electronic data and programs relating to the present embodiment. An external storage apparatus may be used to achieve a similar function. Here, an external storage apparatus, for example, can be implemented by media (a storage medium) and an external storage drive for implementing access to the media. Known examples of such media include a flexible disk (FD), a CD-ROM, a DVD, USB memory, MO, flash memory, and the like. Also, the external storage apparatus may be a server apparatus or the like connected on a network.

The display unit 205, for example, is a CRT display or a liquid crystal display that outputs an image on a display screen. Note that the display unit 205 may be an external device connected to the information processing apparatus 200 by a wired connection or a wireless connection. The operation unit 206 includes a keyboard and a mouse and receives various operations by a user. The communication unit 207 performs communication in both directions with another information processing apparatus, a communication device, or an external storage apparatus via a wired or wireless connection using known communication technology.

Functional Block Diagram

FIG. 2B is an example of a block diagram illustrating the functional configuration of the information processing apparatus 200. The functional units are implemented by a program stored in the ROM 202 being deployed on the RAM 203 by the CPU 201 and the processing according to each flowchart described below being executed. Then, the execution result of each item of processing is stored in the RAM 203. Also, for example, in a case where hardware is substituted for the software processing using the CPU 201, the functional units described here may be configured by calculation units and circuits corresponding to the processing of the functional units.

A management unit 222 manages the images captured at different time periods, the deformation data corresponding to the images, and structural information relating to the construction stored in a storage unit 221 (for example, the HDD 204). An important deformation selection unit 223 selects deformation data, for which the progress degree is to be calculated, as an important deformation from the first deformation data. A search range setting unit 224 sets the range for a search in a second deformation data for a deformation corresponding to the important deformation selected by the important deformation selection unit 223. A matching degree calculation unit 225 executes processing to calculate a matching degree using the deformations within the search range and the important deformation. A reference deformation determining unit 226 determines a deformation corresponding to the important deformation as a reference deformation on the basis of the matching degree calculation result. A progress degree calculation unit 227 executes processing to calculate the difference between the important deformation and the reference deformation as a progress degree.

Description of Relationship Between Image and Deformation Data and Structural Information.

Figure 3A:
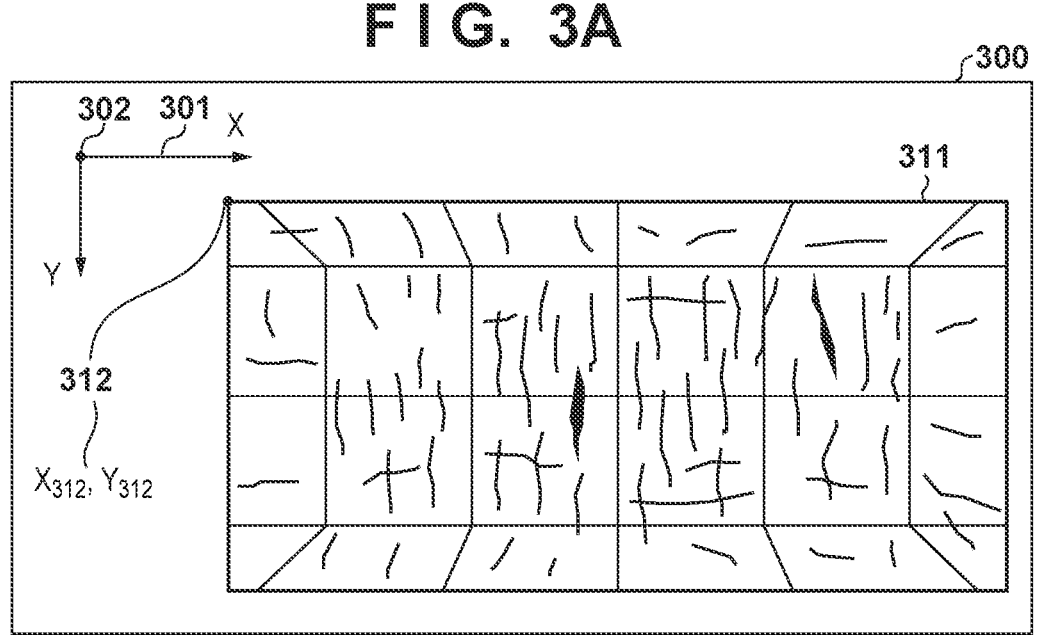

As part of the description of the present embodiment, the relationship between an image and the deformation data and structural information will be described. In image inspection, a captured image of a construction wall surface is preferably associated with the design drawing and managed. FIG. 3A is a diagram illustrating an example of an infrastructure construction in which an image 311 captured of a bridge wall surface is placed on a drawing 300. The drawing 300 has drawing coordinates 301 originated at a point 302. The position of the image on the drawing is defined by the vertex coordinates in the top-left of the image. For example, the coordinates indicating the position of the image 311 on the drawing correspond to the position of a vertex 312 (x312, y312). The image with the coordinates information is stored in the storage unit 221. In the present embodiment, the image used in the image inspection of an infrastructure construction is captured at a high resolution (for example, 1 pixel per 1 mm) so that fine cracks can be checked. Thus, the size of the image of the construction used in inspection is large. For example, the image 311 of FIG. 3A is a captured image of a 20 m×10 m slab of a bridge. In a case where the image resolution is 1 pixel per 1.0 mm (1.0 mm per pixel), the image size of the image 311 is 20000 pixels×10000 pixels. Though multiple (for example, 1000 or more) deformations, such as cracks, exposure of reinforcement, and the like, are present in the image 311 captured at a high resolution, it is difficult to illustrate all of these deformations on a page. Thus, the deformations illustrated on the page are just a portion. Even for diagrams illustrating broad range images and deformation data used in the description below, the illustrated deformations are just a portion of all of the deformations.

Figure 3B:
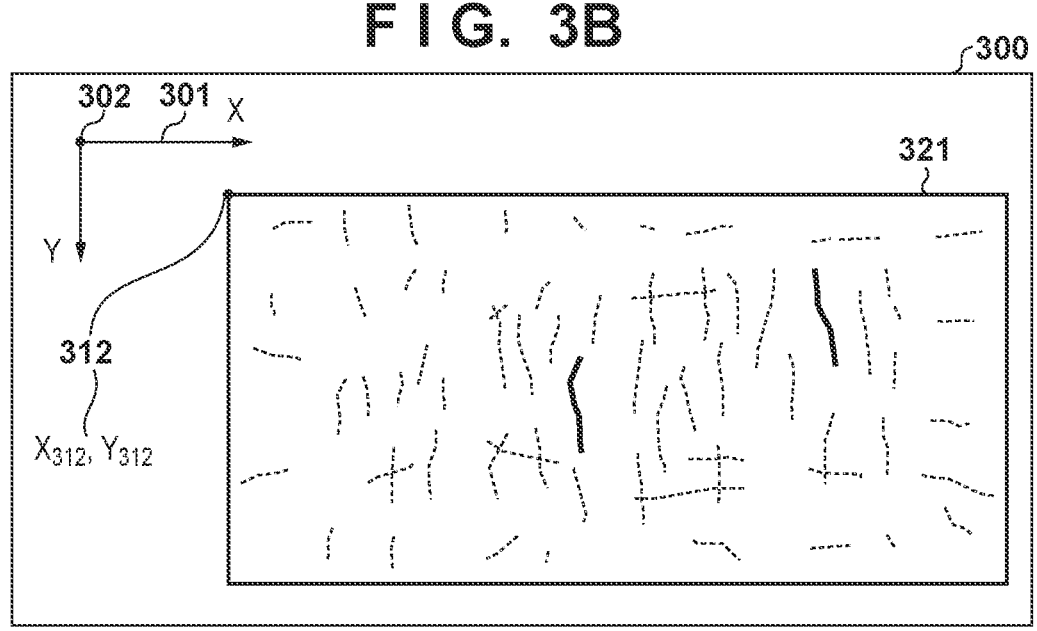

The deformation data is information including stored automatic detection results or results input by a human of deformations such as cracks in a concrete wall surface. In this description of the present embodiment, the deformation data is associated with a drawing and managed. FIG. 3B is a diagram illustrating deformation data 321 corresponding to the image 311 with the deformation data 321 placed on the drawing 300 at the same position as the image 311. In the deformation data 321, multiple (for example, 1000 or more) deformations including deformations that do not appear on the surface are present. The positions on the drawing of each deformation data in the deformation data 321 is defined by the pixel coordinates configuring the deformation data. FIG. 3C is a diagram illustrating an example of a deformation data table 331 representing the data structure of the deformation data. A first and second field in the deformation data table 331 indicate the ID and deformation type, respectively, for identifying the deformation. Also, a third field of the deformation data table 331 belongs to a coordinates column indicating a plurality of coordinates constituting the deformation data, and a fourth field of the deformation data table 331 belongs to a numerical value column indicating an attribute value representing the width of the deformation at the coordinates. For example, a crack C001 is indicated to be illustrated at a continuous series of pixels from (Xc001_1, Yc001_1) to a point n at (Xc001_$n$, Yc001_$n$). Also, in fifth to seventh fields in the deformation data table 331, maximum width, total extension length/outline length, area.

In this manner, in the present embodiment, the deformation data is expressed in terms of pixels. The deformation data may be expressed in terms of vector data of polylines, curved lines, or the like constituted of a plurality of points. In a case where the deformation data is expressed in terms of vector data, the volume of data is reduced, allowing the expression of data to be more simplified. An example of the deformation data which is not a crack is an exposure of reinforcement with an ID of T001. In a case where an exposure of reinforcement of expressed in terms of polylines, the deformation has a region enclosed by the polylines. Note that the attribute information of the deformation data is not limited to the attribute information indicated in the deformation data table 331, and other attribute information may be stored.

"Structural information" is information relating to the structure of the construction to be inspected and includes items such as type of construction and basic structure, various dimensions of the construction, member information, and year of completion. Also, as a repair record, information relating to maintenance including repair year, repair section, and repair method may be included. In the present embodiment, the structural information relating to the specific location of the construction, such as member information and repair information, is stored together with the drawing-based location information. In other words, the location on the drawing of the members and the location of the drawing of the repair section are stored as a part of the structural information. Accordingly, the corresponding relationship between the structural information and the image and the deformation data can be obtained via the drawing. The structural information can be stored in the storage unit 221 together with the images and the deformation data and can be acquired by the management unit 222. Note that the information included in the structural information to not limited to the information described above, and other information may be stored. Also, depending on the type of construction, information specific to each type may be stored.

Flowchart

Figure 4:
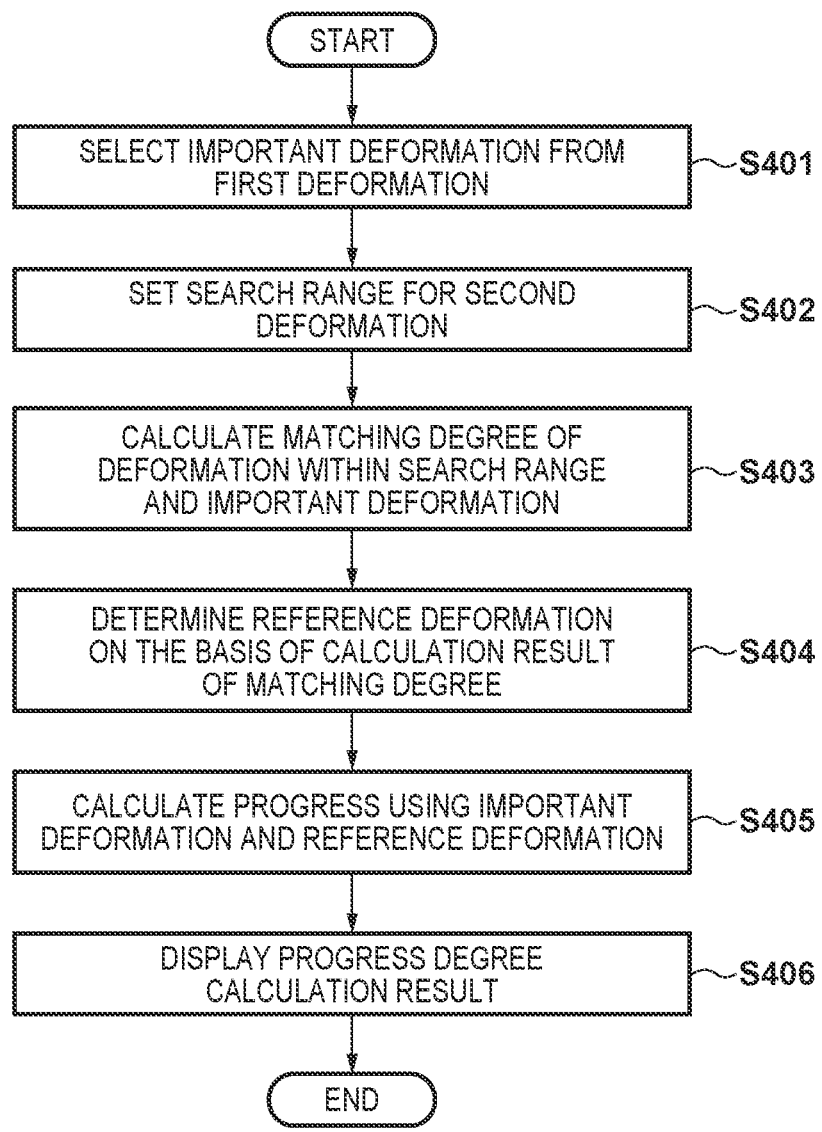
FIG. 4 is a flowchart illustrating the processing contents of a first embodiment.

FIG. 4 is a flowchart illustrating a flow of the main processing of the information processing apparatus in the present embodiment. The process (steps) will be described below with an "S" attached to the front of the reference signs. In the present embodiment, to calculate the progress degree of the deformation in the wall surface of a construction, the first and second images captured at different time periods are used. The time period when the first image is capture is a time period years (five years) after the time period when the second image was captured. Both the first image and the second image are captured images of multiple (for example, 1000 or more) deformations in the wall surface of a construction. The data of the deformations detected from the first image corresponds to the first deformation data, and the data of the deformations detected from the second image corresponds to the second deformation data. In the present embodiment, via the operation unit 206, a processing start input is received, and the processing of the flowchart of FIG. 4 starts. Then, when the calculation processing of the progress degree is completed, the display data indicating the progress degree calculation result is displayed on the display unit 205, and the processing ends. The processing of the present embodiment according to the flowchart of FIG. 4 will be described below.

Important Deformation Selection

In step S401, the important deformation selection unit 223 selects, as an important deformation, a deformation to perform progress degree calculation on from the first deformation data corresponding to the first image. The method of selecting the important deformation is, for example, the method of selecting on the basis of the attribute information of the deformation data. In the following description of the present embodiment, as an example of the method of calculating the progress degree of a crack, a method of selecting an important deformation from the first deformation data on the basis of the maximum width of the deformation data is used.

FIG. 5A is a diagram illustrating a first image 501 placed on coordinates 503 on a drawing 500, and FIG. 5B is a diagram illustrating first deformation data 502 in the first image 501. The size of the first image 501 is 20000 pixels× 10000 pixels. The dashed line and the solid line in the first deformation data 502 indicate a crack with a maximum width of less than 1.0 mm and a crack with a maximum width of 1.0 mm or greater, respectively. In the first image 501 and the first deformation data 502, multiple deformations are present that does not appear on the surface.

As the method of selecting an important deformation from the first deformation data 502, a method of selecting, as an important deformation to be the target of determination for the state of secular change, deformation data with a maximum width equal to or greater than a reference value is used, for example. The determination formula is represented by the following Formula (1).

$$W \leq Wc \tag{1}$$

Here, the parameter Wc is a value of the maximum width of each piece of deformation data, and the parameter W is the reference value (or a threshold) to determine whether or not the deformation is an important deformation. In one example of a method of determining the parameter W in the present embodiment, a preset uniform reference value may be used as the threshold for the entire construction of each deformation type. For example, in a case where the deformation type is a crack and the reference value W is 1.0 mm, in deformation data 502, deformations 511, 512 indicated by a solid line indicating that they are wide cracks of 1.0 mm or more are selected as important deformations. In another example of a method of determining the parameter W, a preset reference value may be used for each piece of structural information. FIG. 5C is a diagram illustrating an example of a reference value list 521 of different structures in a bridge. The corresponding relationship between the image and deformation data and the structure of the construction can be obtained via the drawing. Accordingly, the reference value for selecting an important deformation can be switched depending on the structure to be inspected. These reference values may be values obtained empirically or may be determined on the basis of a database of previously collected inspection results. Also, as another method of determining the parameter W, the user may directly specify the method. In a case where the user specifies the reference value, the range for specifying the reference value is preferably able to be set as a discretionary range. For example, the reference value may be specified per image or per partial image or may be specified per piece of structural information (for example, per member or per construction).

In another example of a method of selecting an important deformation on the basis of the maximum width, the deformation data with the top ten maximum widths may be selected as important deformations. By fixing the number of important deformations to be selected, an increase in the processing time to calculate the progress degree can be suppressed. Also, in another example method, the top 1% of deformation data in terms of largest maximum widths may be selected as important deformations.

In the foregoing, an example of selecting an important deformation using the maximum width, which is one type of attribute information, has been described. However, the used attribute information is not limited to maximum width. For example, a crack with a length equal to or greater than the reference value can be selected as an important deformation on the basis of the total extension length indicating the crack length. In this case, Formula (1) for determining whether or not a deformation is an important deformation, the method of determining the crack length reference value (parameter W), and the like can be used in a similar manner as in the case of using the maximum width.

In another example of a method of selecting an important deformation, a composite deformation including a combination of a plurality of pieces of deformation data may be selected. An example of a composite deformation is a grid-like shaped crack 531 including a combination of similar cracks illustrated in FIG. 5D. When a plurality of cracks intersect and form a grid-like shape, the concrete wall surface of a region 532 enclosed by diagonal lines is susceptible to peeling. As a result, there is an increased possibility of degradation and the like of the inner portion of the construction due to concrete falling off or exposure of reinforcement. Thus, composite deformations including a plurality of similar deformations such as the grid-like shaped crack 531 are preferably selected as an important deformation. A discretionary method can be used as the method for identifying a grid-like shaped crack. For example, in a case where a linked plurality of cracks with shapes that partially overlap are selected to form a closed region, the selected plurality of cracks can be identified as a grid-like shaped crack. Another example of a composite deformation including a combination of a plurality of pieces of deformation data is a composite deformation including a combination of deformations of different deformation types. For example, a composite deformation 533 where efflorescence has occurred is present near a crack as illustrated in FIG. 5E. For cracks with deposits, there is a possibility that cracks are progressing in the inner portion of the construction, and the effects on the function of the construction is high. Thus, deformations such as the composite deformation 533 are preferably selected as an important deformation. Note that composite deformations such as cracks with deposits can be identified on the basis of the type of deformation, the shape of the deformation, and the relative positional relationship. In another example of a method of selecting an important deformation, an important deformation may be selected using structural information. For example, in the wall surface installed with reinforcement near the surface of the construction, when the concrete of the wall surface separates, the reinforcement is exposed, making the degradation of the construction likely to progress. Thus, it is preferable to select, as important deformations, deformations near a wall surface where member material such as reinforcements are internally installed. The information relating to structural members such as reinforcements and member materials is stored as structural information in the storage unit 221. Thus, the relative positional relationship of the images and deformation data and the reinforcements inside the construction can be obtained via the drawing.

Search Range Setting

In step S402, the search range setting unit 224 sets the search range for searching for a deformation corresponding to an important deformation from the second deformation data. The method for setting the search range will be described in reference to FIGS. 6A to 6D.

Figure 6A:
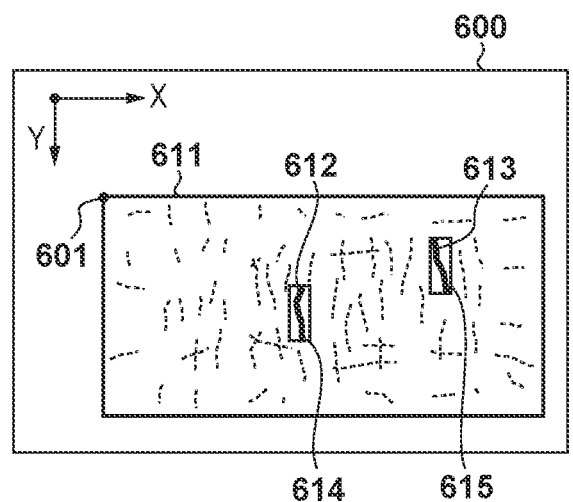
FIGS. 6A to 6D are diagrams for describing examples for setting a search range.
Figure 6B:
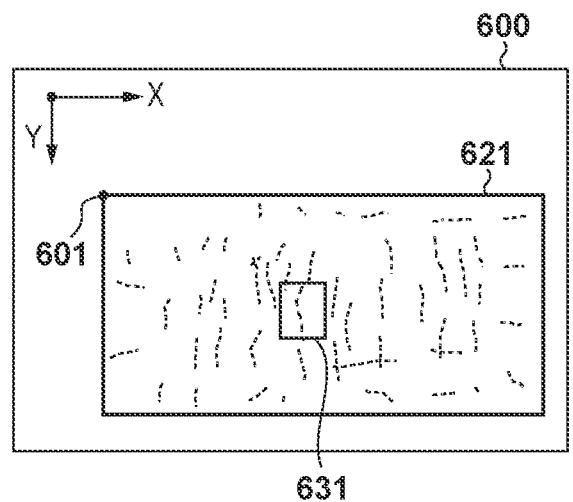

FIG. 6A is a diagram illustrating a first deformation data 611, and FIG. 6B is a diagram illustrating a second deformation data 621. Each of these pieces of deformation data are placed on a drawing 600 at the same position. From the first deformation data 611, deformations 612, 613 indicated by a solid line are important deformations selected by the important deformation selection unit 223.

One example of a method for setting the search range is a method for setting on the basis of coordinate information of an important deformation. Specifically, rectangular ranges 614, 615 surrounding the important deformations 612, 613 on the first deformation data 611 is set as the search range for each important deformation. The size of the search range is only required to be a rectangular range surrounding the coordinate information of the important deformation, and the size may be changed to a discretionary size. For example, the rectangular range surrounding the important deformation may be the initial range, and the rectangular range may be expanded a discretionary number of sizes in the X-axis and the Y-axis direction on the drawing and set as the search range.

Figure 6C:
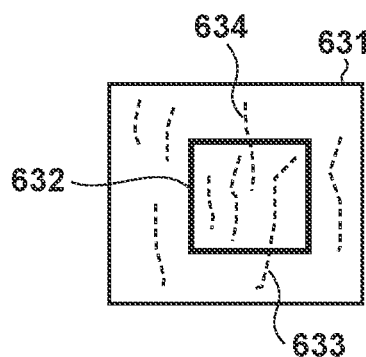
Figure 6D:
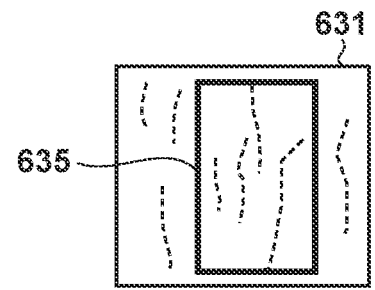

In a case where only the coordinate information of the important deformation is used to determine the search range, a portion of the second deformation data near the boundary of the search range may be segmented. FIG. 6C is a diagram illustrating, in an example where a portion of a deformation of the second deformation data is segmented, a region 631, which is a portion of the second deformation data 621, and a search range 632 determined using the coordinate information of the important deformation 612. In the search range 632 illustrated in FIG. 6C, deformations 633, 634 are segmented near the boundary. In a case where a search range is set with the second deformation data segmented, the matching degree calculation processing of step S403 described below is made complicated. Thus, the rectangular range is expanded to include all of the coordinates of the deformations 633, 634. FIG. 6D is a diagram illustrating a post-expansion search range 635. In a preferred method, the search range is expanded to remove segmentation of the second deformation data in this manner.

Matching Degree Calculation

In step S403, the matching degree calculation unit 225 executes processing to calculate the matching degree using the important deformation and the deformations within the search range. In one example of a method for calculating the matching degree, both or one of one deformation within the search range and the important deformation are enlarged and the degree of correspondence between the two deformations is calculated as the matching degree. An example of the matching degree calculation processing will be described with reference to FIGS. 7A to 7D.

Figure 7A:
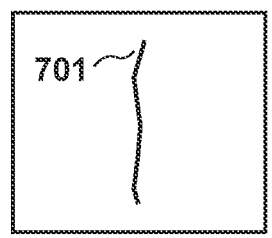
FIGS. 7A to 7C are diagrams for describing examples for calculating a matching degree.
Figure 7B:
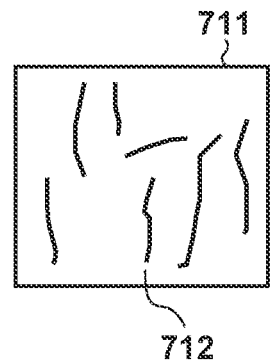
Figure 7C:
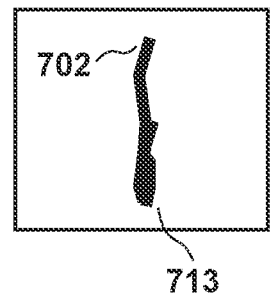

FIG. 7A is a diagram illustrating an important deformation 701 selected by the important deformation selection unit 223 from the first deformation data. FIG. 7B is a diagram illustrating, of the second deformation data, deformation data 711 included in the search range corresponding to the important deformation 701. To calculate the matching degree, first, a deformation 712 is selected from the deformation data 711 as a single reference deformation candidate. Next, processing is executed to align and overlap the deformation 712 and the shape of the important deformation 701. At this time, to take into consideration misalignment across the first deformation data and the second deformation data, the shape of the deformation is enlarged before aligning is performed. FIG. 7C is a diagram illustrating an enlarged important deformation 702 and an enlarged reference deformation candidate 713 aligned and overlapped. Then, the degree of overlap between the important deformation 702 and the reference deformation candidate 713 is calculated as the matching degree. A matching degree C is calculated according to the following Formula (2), for example.

$$C=\{S_1 \wedge S_2\}/\{S_1 \vee S_2\} \quad (2)$$

In this formula, $\wedge$ is the logical conjunction, and $\vee$ is the logical disjunction. Also, the parameter $S_1$ represents the area of the important deformation 702 after enlargement, and the parameter $S_2$ represents the area of the reference deformation candidate 713 after enlargement. With Formula (2), in a case where the deformations are a match, the matching degree C corresponds to 1, and in a case where the deformations have no overlap, the matching degree C corresponds to 0. In other words, when calculating the degree of overlap of the deformations as the matching degree, the matching degree falls within a range from 0 to 1.

After one matching degree has been calculated using Formula (2), the important deformation stays the same, and another deformation is selected as the next reference deformation candidate from the deformation data within the search range. Then, the matching degree is calculated. By repeating this matching degree calculation processing, the matching degrees for all of the pieces of deformation data within the search range are calculated.

As another method for calculating the matching degree, a feature value calculated from the deformation data may be used. For example, calculation formulas for calculating the matching degree C using the centroid coordinates of the deformation are represented by Formulas (3) and (4).

$$C=1/\{(S_{1x}-S_{2x})^2+(S_{1y}-S_{2y})^2\}^{1/2} \quad (3)$$

$$C=C_c \quad (4)$$

Here, the parameters $S_{1x}$, $S_{1y}$ represent the centroid coordinates ($S_{1x}$, $S_{1y}$) of the important deformation, and the parameters $S_{2x}$, $S_{2y}$ represent the centroid coordinates ($S_{2x}$, $S_{2y}$) of the reference deformation candidate. The parameter $C_c$ is a fixed value in a case where the centroid coordinates of the deformations match and is a discretionary constant greater than 1. With Formula (3), the greater the distance between the centroids of the deformations, the smaller the value of the matching degree C. Alternatively, in a case where the centroids of the deformations match, the matching degree is the highest constant $C_c$.

Reference Deformation Determination (Decision)

In step S404, the reference deformation determining (deciding) unit 226 executes processing to determine a reference deformation corresponding to the important deformation on the basis of the calculation result of the matching degree. An example in which the reference deformation is determined using the matching degree will be described with reference to FIGS. 8A to 8D. Here, the matching degree used in the present embodiment is a matching degree obtained by calculation on the basis of the degree of overlap between the deformations. Accordingly, the value of the matching degree falls within a range from 0 to 1, and values closer to 1 indicate a higher matching degree between the deformations.

FIGS. 8A and 8B are diagram illustrating an important deformation 801 for which matching degree calculation is to be performed and deformation data 802 within the search range corresponding to the important deformation 801. Near the deformations in the deformation data 802, IDs constituted by "CR" followed by a number are indicated. FIG. 8C is a diagram illustrating a matching degree list 803 of the matching degrees, with the important deformation 801, for each of the deformations (reference deformation candidates) in the deformation data 802. In one example of a method for determining the reference deformation on the basis of the matching degree, the deformation with the highest matching degree is determined as the reference deformation. For example, of the deformations in the matching degree list 803 of FIG. 8C, the deformation (ID: CR001) with the highest matching degree is determined as the reference deformation. As in the matching degree list 803, in a case where there is only one deformation with the highest matching degree, the reference deformation can be uniquely determined using the matching degree.

On the other hand, as illustrated in FIG. 8D, in a case where there are a plurality of deformations with the highest value for the matching degree, the reference deformation cannot be uniquely determined. In such a case, it is preferable that image data indicating the plurality of deformations with the highest matching degree and the important deformation is generated and displayed on the display unit 205 for the user to select the reference deformation.

In the matching degree calculation results, the highest value for the matching degree may be a value close to 0 (for example, 0.1). Here, the reference deformation can be uniquely determined on the basis of the matching degree, however, there is a high probability that the deformation is not suitable to be used as the reference deformation. In such a case, when the calculated highest matching degree is less than a predetermined reference value (for example, 0.2), preferably, image data indicating the matching degree highest value together with the reference deformation and the important deformation is generated and displayed on the display unit 205 for the user to check, correct, and select the reference deformation.

In a case where the calculated matching degrees are all 0, or in a case where the user does not specify a reference deformation as a result of checking, "no reference deformation corresponding to the important deformation" is determined. In this case, in the progress degree calculation processing of step S405 described below, it is determined that the important deformation itself has progressed. Note that in step S404 described above, the reference deformation is determined using the matching degree. However, no such limitation is intended. For example, in another configuration, of the deformations included in the second image, the deformation with the shortest distance from the location of the coordinates of the important deformation may be determined as the reference deformation. Also, in another configuration, the configuration deformation is determined on the basis of user selection.

Progress Degree Calculation

In step S405, the progress degree calculation unit 227 calculates the progress degree for the important deformation using the important deformation and the reference deformation. In the present embodiment, processing is executed to obtain the difference between attribute values of the deformation data as the progress degree. For example, in a case where the type of deformation is a crack, the difference between the maximum width or the total extension length is calculated. The maximum width or total extension length of the crack is stored in the storage unit 221. Thus, the maximum width and the total extension length of both the important deformation and the reference deformation are acquired and the difference between the deformations is obtained to calculate the progress degree of the important deformation. In a case where the type of deformation is not a crack, a similar method can be used to calculate the progress degree. For example, in a case where the type of deformation is an exposure of reinforcement, the difference in area is calculated as the progress degree. The area of deformation data is stored as the attribute value in the storage unit 221. Thus, the area of the important deformation and the reference deformation are acquired and the difference in area between the deformations is obtained to calculate the progress degree. Note that in step S405 in the example described above, information indicating the state of secular change of the deformation is determined as the progress degree. However, no such limitation is intended. For example, a configuration may be used in which, in step S405, information of two values, "progressing" and "not progressing" may be obtained by the information processing apparatus 200 as the information indicating the state of secular change.

Then, in step S406, the progress degree calculation unit 227 outputs the calculated progress degree to the display unit 205, and the calculated progress degree is displayed and presented to the user. How the progress degree is displayed in not particularly limited, and a numerical value indicating the progress degree may be displayed or the deformation data may be displayed in different colors corresponding to the progress degree.

Modified Example of First Embodiment

In the first embodiment described above, the progress degree is calculated by an important deformation being selected from the first deformation data and a reference deformation corresponding to the important deformation being obtained from the second deformation data. However, in another embodiment, an important deformation may be selected from the second deformation data. In other words, the progress degree is calculated by an important deformation being selected from the second deformation data corresponding to a past inspection result and a reference deformation corresponding to the important deformation is obtained from the first deformation data. In this manner, for example, how a deformation, for which it is important to determine soundness on the basis of a previous inspection result, has progressed can be checked.

According to the first embodiment described above, even in a case where a plurality of deformations such as cracks detected from a captured image from different time periods are present, by restricting calculations to only the deformations for which a soundness determination is important, the progress degrees can be efficiently calculated.

Second Embodiment

In the first embodiment described above, the progress degree of a portion of deformations deemed important from among multiple deformations is obtained. To determine the soundness of a construction, in addition to the progress degree of a portion of the deformations, the overall deformation progression tendency may also be wished to be checked. However, determining the overall deformation progression tendency from the progress degree of only a portion of the deformations is difficult. Here, in the second embodiment described below, in addition to the progress degree of a portion of the deformations, the progress degree of deformation data of each small region is calculated. Specifically, the image is divided, the deformation data is grouped into divided regions, and the progress degree per group is calculated. In this manner, the soundness of a construction or member can be determined while checking both the progress degree of a portion of deformations and the overall deformation progress degree. The second embodiment will be described below, focusing on the differences with the first embodiment.

Figure 9:
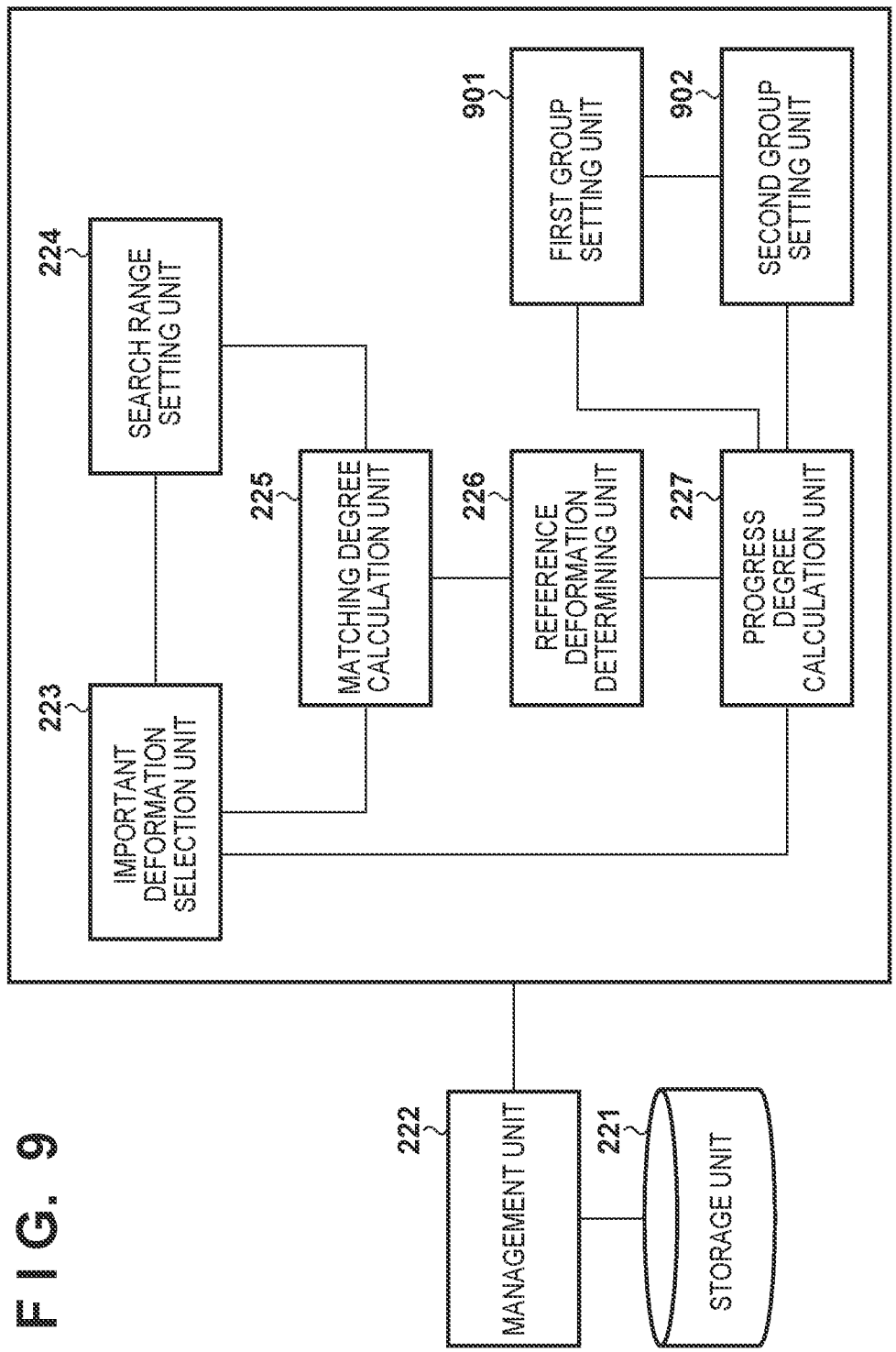
FIG. 9 is a functional block diagram of a second embodiment.

The hardware configuration of the information processing apparatus 200 according to the second embodiment is based on the configuration of the first embodiment illustrated in FIG. 2A, and thus description thereof will be omitted. FIG. 9 is a diagram illustrating an example of a functional block diagram of the information processing apparatus 200 according to the configuration of the second embodiment. The configuration of the second embodiment is the same as that of the first embodiment illustrated in FIG. 2B with a first group setting unit 901 and a second group setting unit 902 being added. The first group setting unit 901 is a functional unit of the CPU 201 that creates a first deformation group by grouping together a portion of the first deformation data. The second group setting unit 902 is a functional unit of the CPU 201 that creates a second deformation group corresponding to the first deformation group. Note that the progress degree calculation unit 227, in addition to executing processing to calculate the progress degree of a portion of the deformations, executes processing to calculate the progress degree per deformation group using the first deformation group and the second deformation group.

Figure 10:
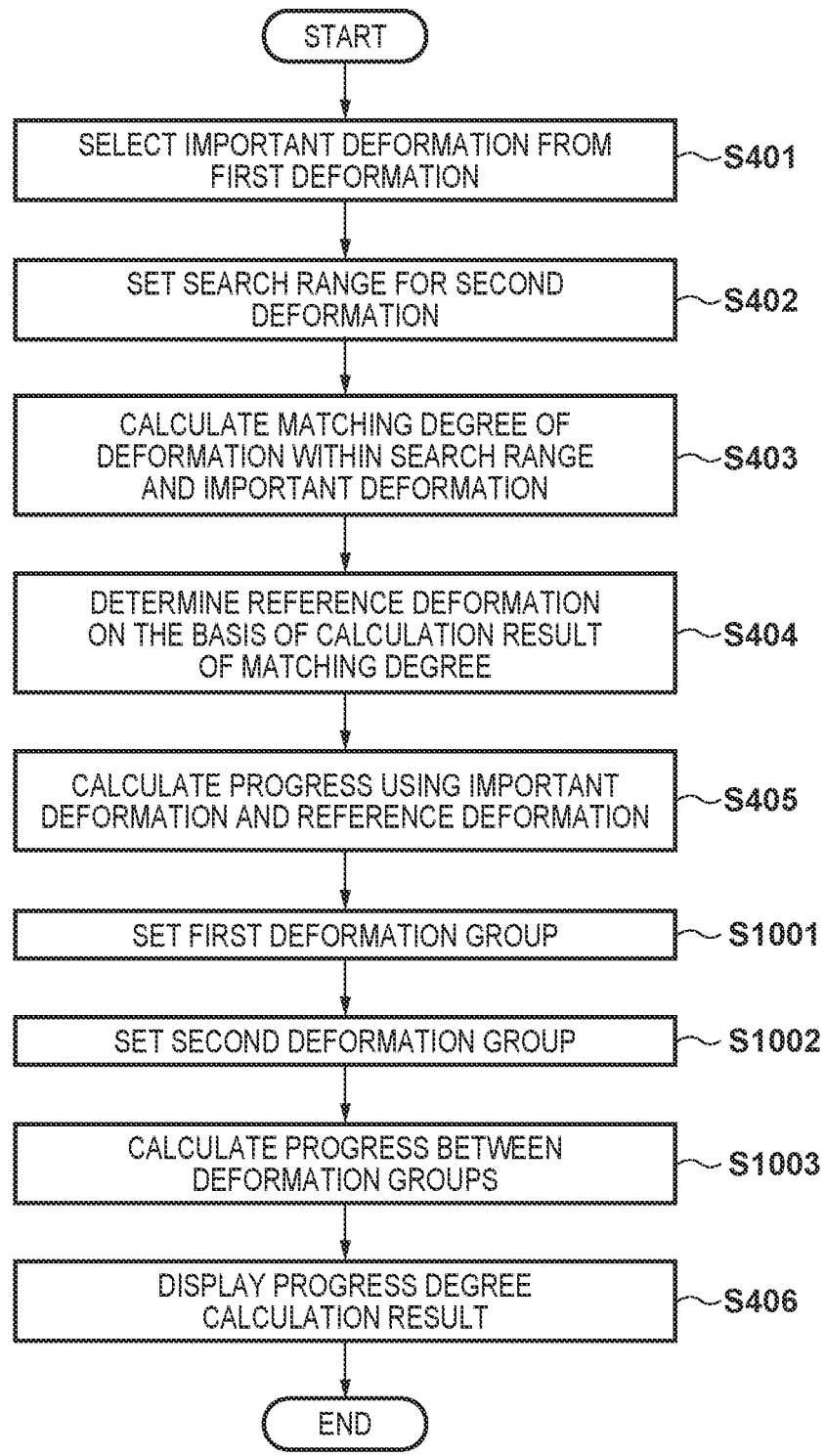
FIG. 10 is a flowchart illustrating the processing contents of the second embodiment.

FIG. 10 is a flowchart illustrating a portion of the main processing executed by the information processing apparatus 200 according to the second embodiment. Note that in the flowchart of FIG. 10, in the steps with the same number as in the flowchart of FIG. 4 described with reference to the first embodiment, processing similar to that executed in the first embodiment is executed. In a case of the second embodiment, after the progress degree of the important deformation is calculated in step S405, the processing proceeds to step S1001.

In step S1001, the first group setting unit 901 executes processing to set the first deformation group from the first deformation data. Next, in step S1002, the second group setting unit 902 sets the second deformation group corresponding to the first deformation group. Thereafter, the processing proceeds to step S1003, and the progress degree of the deformation group is calculated using the first deformation group and the second deformation group. As the progress degree of the deformation group, for example, the number of deformations in the deformation group or the total extension length of the deformations is aggregated, and the difference in the aggregated data between the deformation groups is the progress degree. Thereafter, in step S406, the progress degree calculation unit 227 executes processing to display the calculated progress degree on the display unit 205, and then the processing ends.

First Group Setting and Second Group Setting

Figure 11A:
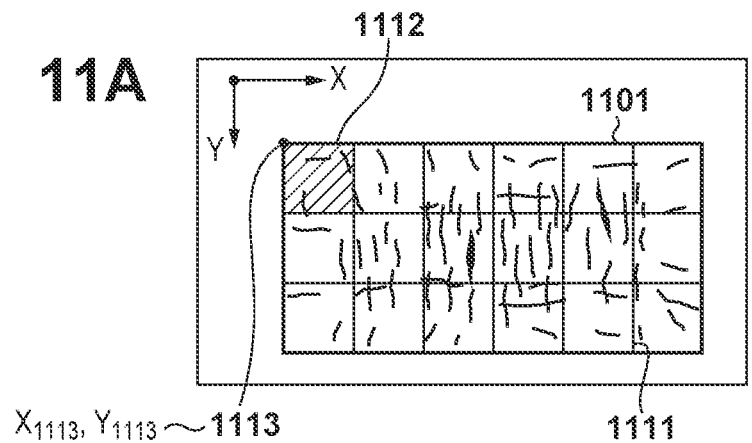
FIGS. 11A to 11E are diagrams for describing the corresponding relationship between deformation groups.
Figure 11B:
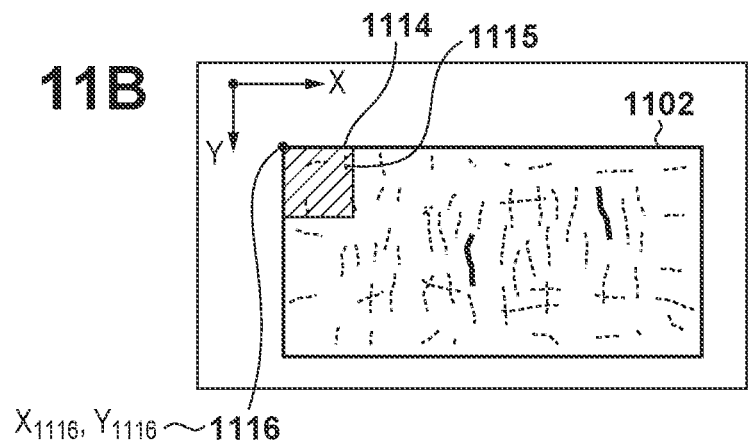
Figure 11C:
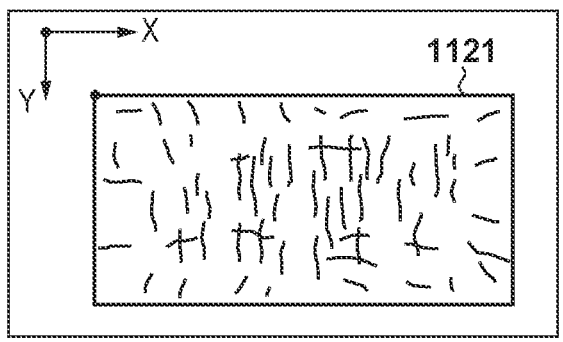
Figure 11D:
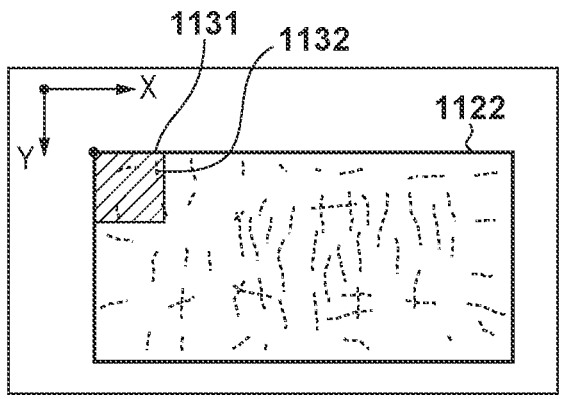

Next, the first deformation group setting of step S1001 and the second deformation group setting of step S1002 will be described in order with reference to FIGS. 11A to 11E. The deformation data according to the second embodiment is a crack in a construction surface as in the first embodiment. Also, the first image and the second image and the deformation data corresponding to these images are all placed in the same position of the same drawing. FIG. 11A is a diagram illustrating a first image 1101, and FIG. 11B is a diagram illustrating a first deformation data 1102 indicating deformations included in the first image 1101. Also, FIG. 11C is a diagram illustrating a second image 1121, and FIG. 11D is a diagram illustrating a second deformation data 1122 indicating deformations included in the second image 1121.

In the processing of step S1001, the first group setting unit 901 sets the first deformation group from the first deformation data. In this example, the method for setting the first deformation group is a method of dividing the first image and grouping the first deformation data into divided regions. First, the first group setting unit 901 divides the first image 1101 into a discretionary fixed size. Line segments 1111 of a grid-like shape are line segments that divide the first image 1101 equally in the X-axis and the Y-axis direction at an interval of 1024 pixels, for example. Next, the first group setting unit 901 selects one region 1112 covered by diagonal lines from among the divided regions and acquires a top-left vertex coordinates 1113 of the region 1112 and the region size. Then, the first group setting unit 901 sets, on the first deformation data 1102, a diagonal line region 1114 with the same position and the same size as the region 1112. Thereafter, the deformation data included in the diagonal line region 1114 is grouped and set as a first deformation group 1115. By repeating this processing for each divided region, first deformation groups can be set for the entire region. In this example, a method of dividing at equal intervals is used as the method for dividing the first image 1101. However, the first image 1101 may be divided at discretionary intervals. For example, the image may be divided at intervals of 1024 pixels in the X-axis direction and 512 pixels in the Y-axis direction, and the first deformation group may be created per rectangular region.

Next, in the processing of step S1002, the second group setting unit 902 sets the second deformation group corresponding to the first deformation group. In an example of a method for setting the second deformation group, the second deformation data included in a region with the same position and the same range as the first deformation group is grouped. In the example described below, the second deformation group corresponding to the first deformation group 1115 is set. First, the second group setting unit 902 acquires top-left vertex coordinates 1116 of the diagonal line region 1114 and the region size. Next, the second group setting unit 902 sets, on the second deformation data 1122 of FIG. 11D, a diagonal line region 1131 with the same position and the same size as the diagonal line region 1114. Thereafter, the second deformation data included in the diagonal line region 1131 is grouped and set as a second deformation group 1132. In this manner, by associating groups of the deformation data at the same position and within the same range, the second deformation group can be set.

Typically, because the image capture conditions are different when capturing images at different time periods, even in a case where an image of the same wall surface of the same construction is captured, misalignment across pixels in the first image and the second image is included. Thus, misalignment across the first deformation data and the second deformation data is also included. In the example described above, this misalignment is ignored, and a first deformation group and a second deformation group are simply created. The progress degree of a deformation across deformation groups is obtained for the purpose of finding a general progression tendency. Thus, looking at the deformation groups does not have to be performed in a precise manner. With this method for simply creating the first deformation group and the second deformation group, the processing for group creation is simplified.

Figures 11E, 12A, 12B:
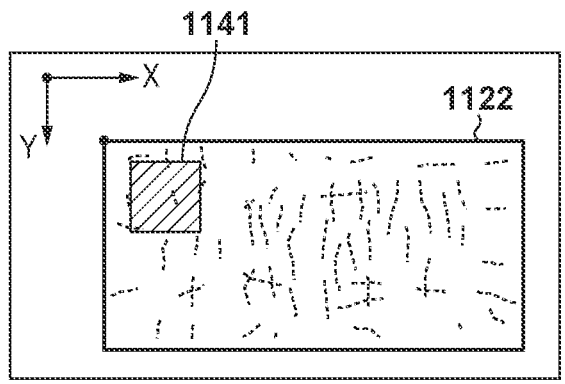
FIGS. 12A to 12C are diagrams for describing progress degrees of deformation groups.

However, when obtaining a corresponding relationship between the deformation groups, misalignment may be taken into account. As an example of a method for acquiring the misalignment across images, an overview of processing to acquire the misalignment of each region using an image feature value will be described. First, a single divided region on the first image is selected, and a partial image within the region is acquired. Next, the acquired partial image is aligned and overlapped with the second image, and the sum of squares of the luminance value different of the pixels is calculated. This calculation processing is repeated while the overlapping position is moved, and the position with this lowest calculation result. i.e., the misalignment per region, is obtained. By repeating the processing for each divided region of the first image, the misalignment across images can be acquired for the entire region on a region basis. As an example of this, a result of misalignment being reflected and the second deformation group set from the first deformation group is illustrated in FIG. 11E. FIG. 11E is a diagram illustrating a second deformation group 1141 obtained by correcting the misalignment from the first deformation group 1115. In this manner, the second deformation group can be set taking into account misalignment across images.

In another example of a method for acquiring the misalignment between deformation groups, determination may be performed on the basis of coordinate information of an important deformation. For example, at least one important deformation included in the first deformation group is selected, and the average of the centroid coordinates of the important deformations is set as the misalignment starting point. Then, the average of the centroid coordinates of the reference deformations corresponding to the selected important deformations is set as the misalignment terminating point. A vector joining the starting point and the terminating point is set as the misalignment of the first deformation group. In this manner, by substituting the misalignment of the important deformations for the misalignment between deformation groups, the second deformation group can be efficiently obtained taking into account misalignment.

Deformation Group Progress Degree Calculation Processing

In step S1003, the progress degree calculation unit 227 calculates the progress degree between the deformation groups from the first deformation group and the second deformation group. In the present embodiment, the aggregated data of the deformation data in the deformation group is used to calculate the progress degree. For example, in a case where the type of deformation is a crack, the number of cracks or the density of cracks for the first deformation group and the second deformation group are obtained as the aggregated data. Thereafter, the progress degree calculation unit 227 calculates the difference in the aggregated data as the progress degree between the deformation groups.

FIGS. 12A and 12B are diagrams illustrating an example of aggregated data 1201 in a case where the type of deformation is a crack and an example of a progress degree 1202 between deformation groups. The aggregated data 1201 is the aggregated result of the number of cracks, the number density, the total extension length, and the average maximum width for the first deformation group and the second deformation group. From the aggregated data 1201, the number can be acquired by counting the number of pieces of deformation data of each deformation group. The number density can be calculated using the region size of the deformation group and the image resolution, in addition to the number of pieces of deformation data. The total extension length and the average maximum width can be calculated by aggregating the attribute values of the pieces of the deformation data in the deformation groups. The progress degree 1202 can be calculated by obtaining the difference of the aggregated data between the deformation groups.

Figure 12C:
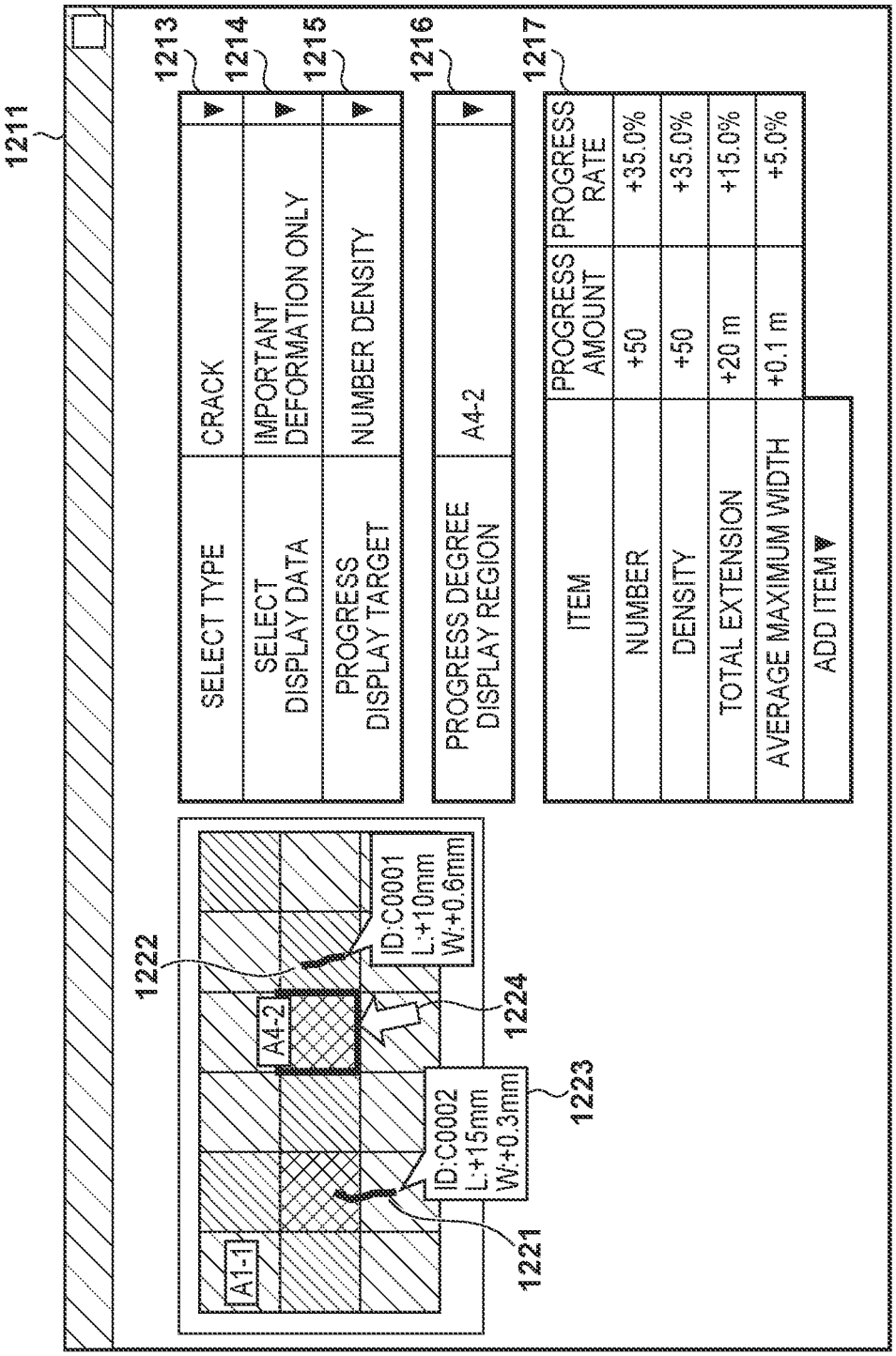

FIG. 12C is a diagram illustrating an example of a visualized screen of the progress degree calculation result according to the second embodiment. FIG. 12C illustrates an example in which the progress degree of an important deformation and the progress degree of deformations of each region are visualized as a visualized result 1212 and displayed in a window 1211. The visualized result 1212 is a result of the visualization of the progress degree relating to the number density of the cracks, and the results are expressed in different patterns for each region depending on the difference in the progress degree. In the visualized result 1212, regions with a high pattern density are an expression of a region with a high progress degree. However, a suitable display method may be used depending on the progress degree in which the luminance or colors are expressed differently for each region. Cracks 1221, 1222 in FIG. 12C are important deformations, and, as illustrated by progress information 1123, information relating to the progress degree near the crack is also displayed near these important deformations. By displaying the progress degree for each region and the progress degree for the important deformations at the same time in this manner, the user can easily check the progress degree of the important deformations and the overall deformation progression tendency.

The user can preferably switch the visualized contents of the progress degree on the visualized screen. For example, in response to a user selection of a type selection item 1213, the CPU 201 switches the progress degree display target deformation data in the visualized result 1212. In response to the user switching a display data selection item 1214, the CPU 201 switches the display target of the deformation data in the visualized result 1212 (for example, display only important deformations, display all deformations). In response to the user switching a progress display target item 1215, the CPU 201 switches the progress degree display target (for example, number density, total extension length, average maximum width) in the visualized result 1212. This method is preferable as the user can switch to the contents they wish to check. Also, it is preferable that the progress degree of the important deformations and the progress degree per region can be checked in detail. For example, a region is selected by selection via a progress degree display region selection 1216 or by a click operation using a mouse 1224. Detailed progress information is displayed according to the region selected. For example, in FIG. 12C, progress information corresponding to the selected region "A4-2" is displayed in a progress result 1217.

According to the second embodiment described above, in addition to the progress degree of a portion of the deformations, the progress degree of the deformations per region can be calculated. Thus, for all of the deformation data, the overall progress degree of the deformations can be determined without determining the degree of matching for each one with previous deformation data. Also, for important deformation data, the progress degree can be determined in detail from past deformation data, such as the amount of change in the crack width.

Third Embodiment

In the second embodiment described above, in addition to the progress degree of a portion of the deformations, the progress degree of the deformations per region is calculated. The degradation state of the construction can differ greatly between sections due to various factors. Thus, in some cases, the progress degree of the deformations in one section may be wished to be checked in detail. However, in a case where the progress degree of the deformations is calculated with a fixed region size, to determine the progress degree in detail, the region size needs to be decreased, leading to a large increase in the processing time. Here, in the third embodiment described below, the progress degree of deformations is calculated with a different region size for each section. By changing the region size that deformations are grouped by depending on the section, an increase to the processing time can be suppressed, and the progress degree of deformations of a specific section can be determined in detail. The third embodiment will be described below, focusing on the differences with the second embodiment.

Figure 13:
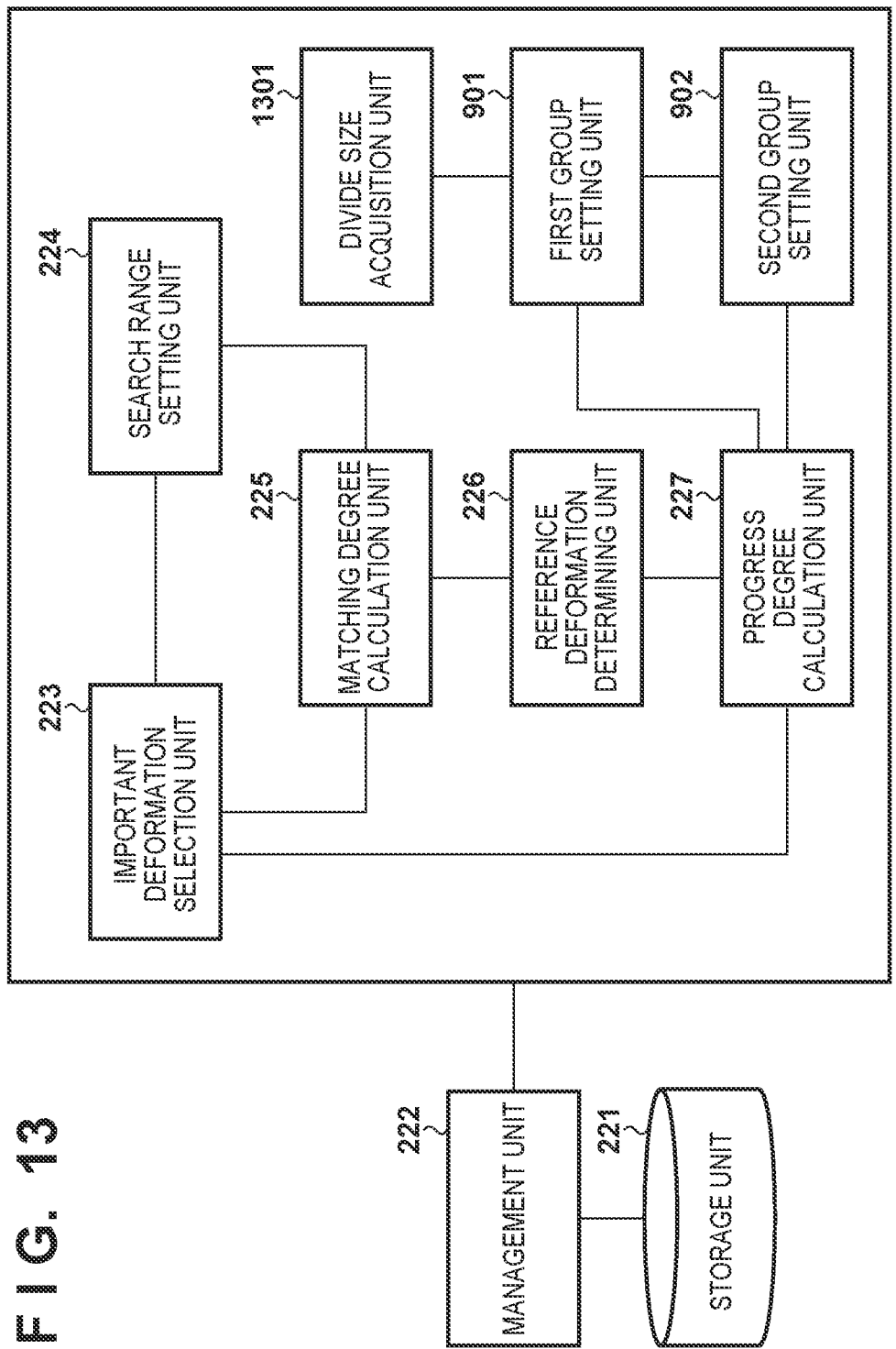
FIG. 13 is a functional block diagram of a third embodiment.

The hardware configuration of the information processing apparatus 200 according to the third embodiment is based on the configuration of the first embodiment illustrated in FIG. 2A, and thus description thereof will be omitted. FIG. 13 is a diagram illustrating an example of a functional block diagram of the information processing apparatus 200 according to the configuration of the third embodiment. The third embodiment has a configuration in which a divide size acquisition unit 1301 is added to the configuration (FIG. 9) illustrated in reference to the second embodiment. The divide size acquisition unit 1301 is a functional unit of the CPU 201 that acquires the size of the range for grouping a portion of the first deformation data.

Figure 14:
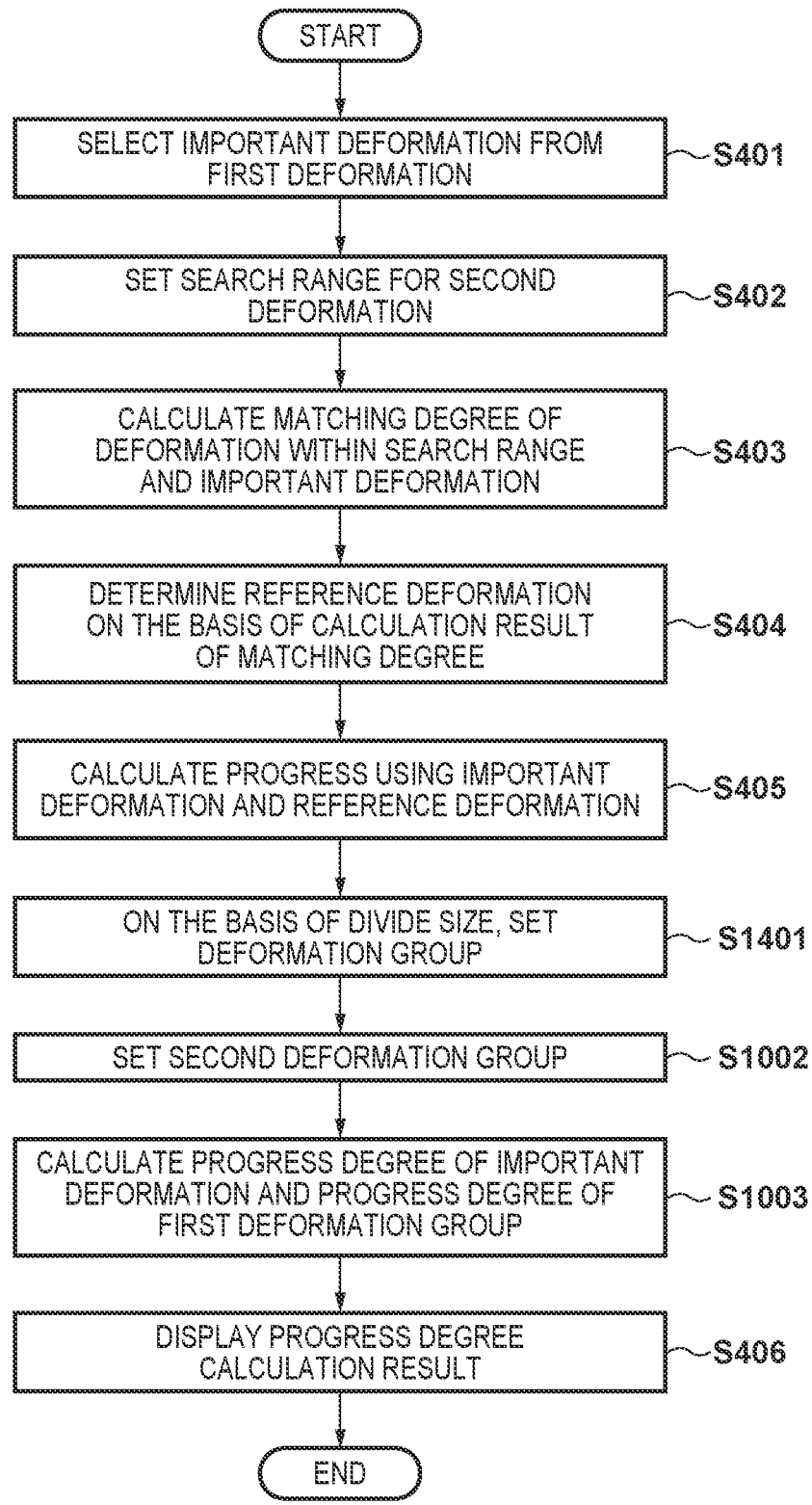
FIG. 14 is a flowchart illustrating the processing contents of the third embodiment.

FIG. 14 is a flowchart illustrating a portion of the main processing executed by the information processing apparatus 200 according to the third embodiment. Note that in the flowchart of FIG. 14, in the steps with the same number as in the flowchart of FIG. 10 described with reference to the second embodiment, processing similar to that executed in the second embodiment is executed. In a case of the third embodiment, after the progress degree of the important deformation is calculated in step S405, the processing proceeds to step S1401.

In step S1401, the first group setting unit 901 executes processing to divide the first deformation data and set the first deformation group on the basis of the divide size acquired by the divide size acquisition unit 1301. Next, in step S1002, the second group setting unit 902 sets the second deformation group corresponding to the first deformation group. Thereafter, the processing proceeds to step S1003, and the progress degree of the deformation group is calculated by the progress degree calculation unit 227 using the first deformation group and the second deformation group. Thereafter, in step S406, the progress degree calculation unit 227 displays the progress degree calculation result on the display unit 205, and then the processing ends.

Different Size First Group Setting

The processing to set the first deformation group with different sizes in step S1401 will be described with reference to FIGS. 15A to 15D. The deformation data according to the present embodiment is a crack in a construction surface as in the second embodiment.

In step S1401, the first group setting unit 901 divides the first deformation data on the basis of the divide size acquired by the divide size acquisition unit 1301 and sets the first deformation group for each divided region. In an example of a method for determining the divide size of the first deformation data, the divide size is determined on the basis of the structural information. FIG. 15A is a diagram illustrating an example of a divide size list 1501 of the different sizes for each section of a bridge. Examples in which the first deformation data is divided using the divide size list 1501 are illustrated in FIGS. 15B and 15C. FIG. 15B is a diagram illustrating a first deformation data 1502 corresponding to an image of a slab of a bridge and a grid-like shaped dividing lines 1511. The size of a diagonal line region 1512 in FIG. 15B is 512 pixels×512 pixels. Also, FIG. 15C is a diagram illustrating a first deformation data 1503 corresponding to an image of a pier of a bridge and a grid-like shaped dividing lines 1521. The size of a diagonal line region 1522 in FIG. 15C is 1024 pixels 1024 pixels. The corresponding relationship between each piece of deformation data and the structural information can be obtained via the drawing. Thus, by using the structural information, the progress degree of the deformations only in a specific section can be obtained in detail. As a method for determining the divide size as illustrated in the divide size list 1501, a value empirically obtained may be used or the divide size specified by a user may be used.

In another example of a method for determining the divide size of the first deformation data, the divide size may be determined on the basis of the distribution state of the deformations. Specifically, for the first deformation data, the distribution state (density) of the deformations is obtained in advance. Then, depending on the distribution state of the deformations, the first deformation data is divided into different sizes. FIG. 15D is a diagram illustrating an example in which a first deformation data 1531 is divided into different sizes according to the distribution state of the deformations. In the first deformation data 1531, the divide size in the central region where deformations are densely formed is small, and the divide size in the end regions where the deformations are sparsely formed is large. In this manner, by changing the divide size on the basis of the distribution state of the deformations, for example, the progress degree of deformations in only the section where the deformations are densely formed can be obtained in detail.

In another example of a method for determining the divide size of the first deformation data, the divide size may be determined on the basis of the important deformations. For example, the divide size of the first deformation data is small near important deformations and large at positions distanced from the important deformations. By determining in detail the progress degree of deformations around the important deformations, the degree of the effects on the construction function of the important deformations and the probability of future progression of the important deformation can be more easily determined.

In another example of a method for determining the divide size of the first deformation data, the first deformation data may be repeatedly divided (divided at multiple division levels) in a plurality of different sizes, and a plurality of first deformation groups with different divide sizes may be created. For example, the entire first deformation data is divided with three patterns of division levels (1024 pixels× 1024 pixels, 512 pixels×512 pixels, and 256 pixels×256 pixels), and the first deformation group is set for each division level. Then, though detailed processing is omitted here, the progress degree of the deformations in each divided region is calculated. By dividing the first deformation data at multiple division levels in this manner, when the user checks the progress degree of the deformations, the user can easily switch between a detailed progress degree in a small range and a general progress degree in a large range. Note that the range of the first deformation data that is divided at multiple division levels may be restricted to a discretionary range for each division level. For example, with the first division level (1024 pixels×1024 pixels), the entire first deformation data is divided, with the second division level (256 pixels×256 pixels), only the region at or near the important deformations in the first deformation data is divided. By restricting the range of the first deformation data for each division level, an increase in the amount of time it takes to calculate the progress degree is suppressed, and the progress degree can be checked in detail in only a specific range.

According to the third embodiment described above, a large increase in the processing time can be suppressed, and the progress degree of the deformations in a specific section can be calculated in detail.

Note that in the embodiments described above, a bridge is used as an example of a construction to facilitate understanding. However, the type of the construction is not limited, and the construction may be a different construction (for example, a building, a dam, or the like).

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-163886, filed Sep. 29, 2020, which is hereby incorporated by reference herein in its entirety.

What is claimed is:

1. An information processing apparatus comprising:
one or more memories storing instructions; and
one or more processors executing the instructions to:
select at least a portion of deformations from among a plurality of deformations included in a first image which is an image of the construction at a first time period, based on at least one of information relating to deformations, information relating to the construction, user selection, or a shape and a relative positional relationship of two or more deformations;
determine a deformation corresponding to the selected deformation from among a plurality of deformations included in a second image which is an image of the construction at a second time period different from the first time period; and
calculate a degree of progress about the selected deformation or the determined deformation, using the selected deformation and the determined deformation.

2. The apparatus according to claim 1, wherein the one or more processors determines the determined deformation corresponding to the selected deformation from among a plurality of deformations included in the second image based on a matching degree indicating a degree of matching between at least a portion of a plurality of deformations included in the second image and the selected deformation.

3. The apparatus according to claim 1, wherein the one or more processors determine a deformation corresponding to the selected deformation from among a plurality of deformations included in the second image based on a degree of overlap when at least one of the selected deformation and at least a portion of a plurality of deformations included in the second image are enlarged, and both of them are aligned and overlapped in terms of position.

4. The apparatus according to claim 1, wherein the one or more processors determines a deformation corresponding to the selected deformation from among a plurality of deformations included in the second image based on a feature value calculated for the selected deformation and at least a portion of a plurality of deformations included in the second image.

5. The apparatus according to claim 1, wherein the one or more processors calculate a difference between information of the selected deformation and information of the determined deformation as a degree of progress.

6. The apparatus according to claim 1, the one or more processors further executing the instructions to:
divide a plurality of deformations included in the first image and sets a first deformation group; and
divide a plurality of deformations included in the second image and sets a second deformation group corresponding to the first deformation group;
wherein the one or more processors calculate a difference between aggregated data of information relating to deformations included in the first deformation group and aggregated data of information relating to deformations included in the second deformation group as a degree of progress.

7. The apparatus according to claim 1, the one or more processors further executing the instructions to:
acquires a divide size for dividing a plurality of deformations included in the first image based on the information relating to the construction and/or the information relating to deformations.

8. The apparatus according to claim 1, wherein the deformations include a crack in the construction.

9. The apparatus according to claim 8, wherein the one or more processors select, as a target for determination of a degree of progress, a deformation indicating a crack with a crack width greater than a predetermined threshold from among a plurality of deformations included in the first image.

10. The apparatus according to claim 8, wherein the one or more processors select, as a target for determination of a degree of progress, a deformation indicating a grid-like shaped crack from among a plurality of deformations included in the first image.

11. The apparatus according to claim 1, wherein the information relating to deformations is attribute information relating to deformations and includes at least one of deformation extension, area, position, or width.

12. The apparatus according to claim 1, wherein the information relating to the construction is attribute information relating to the construction and includes at least one of the construction type, structure, structural member, or member material.

13. A method comprising:
(a) selecting, at least a portion of deformations from among a plurality of deformations included in a first image, which is an image of the construction at a first time period, based on at least one of information relating to deformations, information relating to the construction, user selection, or a shape and a relative positional relationship of two or more deformations;
(b) determining a deformation corresponding to the selected deformation from among a plurality of deformations included in a second image, which is an image of the construction at a second time period different from the first time period; and
(c) calculating a degree of progress about the selected deformation or the determined deformation the selected deformation in the selecting (a) and the deformation determined in the determining (b).

14. A non-transitory computer-readable storage medium storing a program which, when read and executed by a computer, causes the computer to execute a method of controlling an information processing apparatus, the method comprising:
(a) selecting, at least a portion of deformations from among a plurality of deformations included in a first image, which is an image of the construction at a first time period, based on at least one of information relating to deformations, information relating to the construction, user selection, or a shape and a relative positional relationship of two or more deformations;
(b) determining a deformation corresponding to the selected deformation from among a plurality of deformations included in a second image, which is an image of the construction at a second time period different from the first time period; and
(c) calculating a degree of progress about the selected deformation or the determined deformation the selected deformation selected in the selecting (a) and the deformation determined in the determining (b).

15. The apparatus according to claim 1, wherein the one or more processors calculate the degree of progress using the selected deformation and the determined deformation based on difference between the selected deformation and the plurality of deformations included in the second image.

16. The apparatus according to claim 1, wherein the one or more processors calculate the degree of progress using the selected deformation and the determined deformation, based on at least one of length and width of the selected deformation and at least one of length and width of the determined deformation.

17. The apparatus according to claim 1, the one or more processors further executing the instructions to generate display data for displaying the calculated degree of the progress.

* * * * *